United States Patent
Joshi et al.

(10) Patent No.: US 11,122,279 B2
(45) Date of Patent: Sep. 14, 2021

(54) POINT CLOUD COMPRESSION USING CONTINUOUS SURFACE CODES

(71) Applicant: Samsung Electronics Co., Ltd., Suwon-si (KR)

(72) Inventors: Rajan Laxman Joshi, San Diego, CA (US); Neha Dawar, Plano, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/588,728

(22) Filed: Sep. 30, 2019

(65) Prior Publication Data

US 2020/0107033 A1 Apr. 2, 2020

Related U.S. Application Data

(60) Provisional application No. 62/740,133, filed on Oct. 2, 2018, provisional application No. 62/780,487, filed
(Continued)

(51) Int. Cl.
| | | |
|---|---|---|
| *H04N 19/20* | (2014.01) | |
| *H04N 19/184* | (2014.01) | |
| *H04N 19/167* | (2014.01) | |
| *H04N 19/597* | (2014.01) | |
| *H04N 19/44* | (2014.01) | |
| *H04N 19/182* | (2014.01) | |

(52) U.S. Cl.
CPC ........... *H04N 19/20* (2014.11); *H04N 19/167* (2014.11); *H04N 19/182* (2014.11); *H04N 19/184* (2014.11); *H04N 19/44* (2014.11); *H04N 19/597* (2014.11)

(58) Field of Classification Search
CPC .... H04N 19/20; H04N 19/167; H04N 19/182; H04N 19/184
See application file for complete search history.

(56) References Cited

U.S. PATENT DOCUMENTS

| | | | |
|---|---|---|---|
| 10,846,814 B2 * | 11/2020 | Boyce | ........................ G06T 7/20 |
| 2016/0086353 A1 | 3/2016 | Lukac et al. | |
| 2017/0347120 A1 | 11/2017 | Chou et al. | |

(Continued)

OTHER PUBLICATIONS

ISA/KR, International Search Report and Written Opinion of the International Searching Authority, International Application No. PCT/KR2019/012947, Jan. 22, 2020, 8 pages.
(Continued)

*Primary Examiner* — Rowina J Cattungal

(57) ABSTRACT

A decoding device, an encoding device and a method for point cloud decoding is disclosed. The method includes receiving a bitstream. The method also includes decoding, from the compressed bitstream, a first frame, a second frame, and an occupancy map frame. The first and the second frame include pixels representing points of a 3D point cloud at different depths. The occupancy map frame indicates whether the pixels included in the first frame and the second frame at that position in the occupancy map frame are valid pixels and whether points of the 3D point cloud are positioned between the first frame and the second frame at that position in the occupancy map frame. The method further includes generating the 3D point cloud using the first frame, the second frame, and the occupancy map frame.

20 Claims, 12 Drawing Sheets

Related U.S. Application Data on Dec. 17, 2018, provisional application No. 62/803,890, filed on Feb. 11, 2019, provisional application No. 62/820,929, filed on Mar. 20, 2019.

(56) References Cited

U.S. PATENT DOCUMENTS

| | | | |
|---|---|---|---|
| 2019/0156520 A1* | 5/2019 | Mammou | G06T 9/001 |
| 2019/0318519 A1* | 10/2019 | Graziosi | H04N 19/186 |
| 2020/0105024 A1* | 4/2020 | Mammou | G06T 9/001 |
| 2020/0153885 A1* | 5/2020 | Lee | G06T 9/001 |
| 2021/0099701 A1* | 4/2021 | Tourapis | H04N 19/184 |

OTHER PUBLICATIONS

Mekuria, R., et al., "Design, Implementation and Evaluation of a Point Cloud Codec for Tele-Immersive Video," IEEE Transactions on Circuits and Systems for Video Technology, vol. 27, Issue 4, Apr. 2017, 15 pages.

Preda, Marius, "Point Cloud Compression in MPEG," MP20 Workshop on standards, plans and explorations of immersive media, City University of Hong Kong, Oct. 28, 2017, 23 pages.

Schwarz, Sebastian, "2D Video Coding of Volumetric Video Data," 2018 Picture Coding Symposium (PCS), San Francisco, CA, Jun. 24-27, 2018, 6 pages.

"Continuous improvement of Study Text of ISO/IEC CD 23090-5 Video-based Point Cloud Compression", ISO/IEC JTC 1/SC 29/WG 11, N 18479, May 2019, 140 pages.

Joshi, et al., "[V-PCC] [New proposal] Improvements to enhanced delta depth coding for V-PCC", ISO/IEC JTC1/SC29/WG11 MPEG2018/m44853, Oct. 2018, 4 pages.

Joshi, et al., "[V-PCC] Report on Core Experiment CE 2.9 on occupancy map coding", ISO/IEC JTC1/SC29/WG11 MPEG2019/m46048, Jan. 2019, 4 pages.

\* cited by examiner

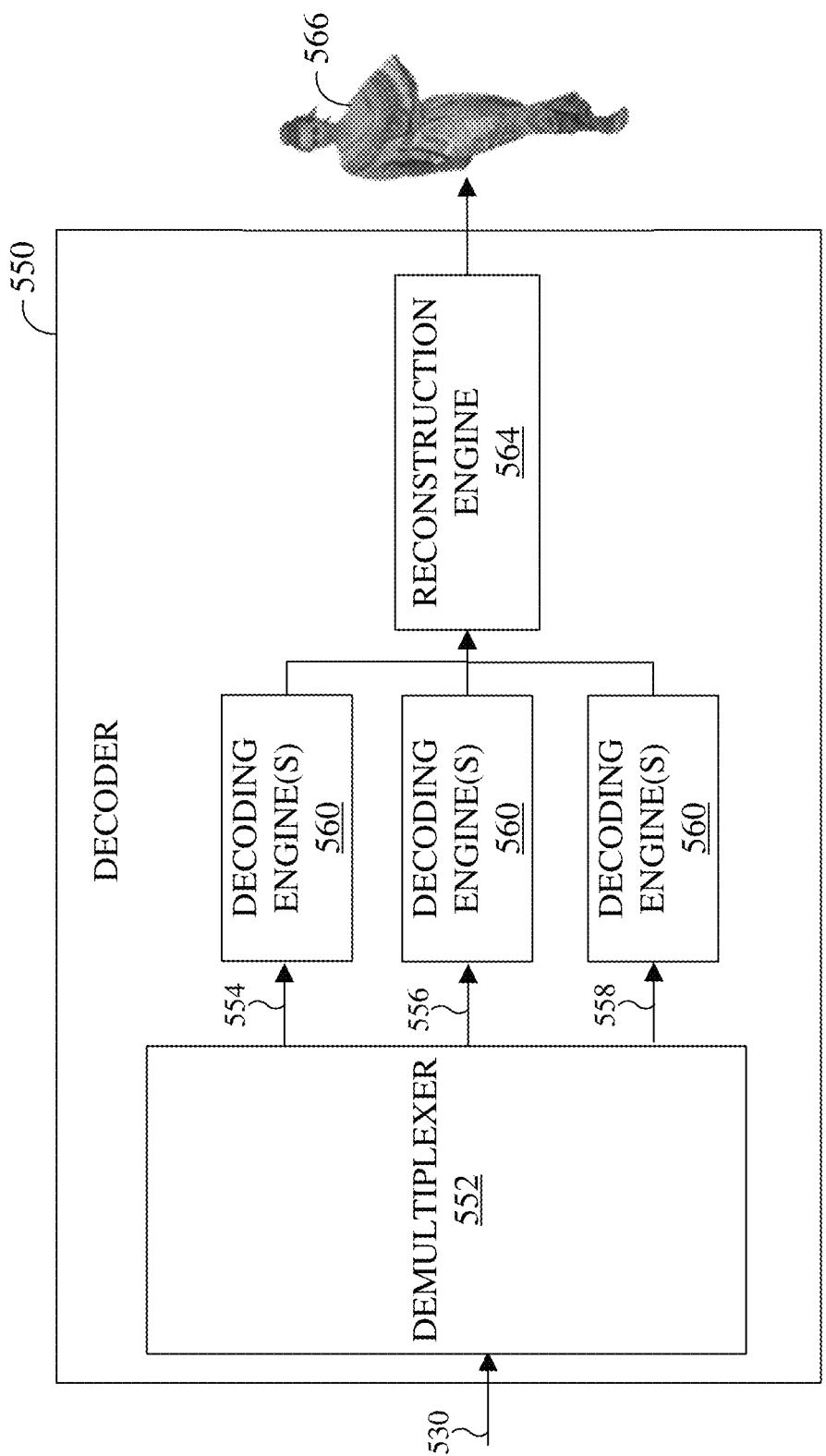

POINT CLOUD COMPRESSION USING CONTINUOUS SURFACE CODES

CROSS-REFERENCE TO RELATED APPLICATION AND CLAIM OF PRIORITY

This application claims priority under 35 U.S.C. § 119(e) to U.S. Provisional Patent Application No. 62/740,133 filed on Oct. 2, 2018, U.S. Provisional Patent Application No. 62/780,487 filed on Dec. 17, 2018, U.S. Provisional Patent Application No. 62/803,890 filed on Feb. 11, 2019, and U.S. Provisional Patent Application No. 62/820,929 filed on Mar. 20, 2019. The above-identified provisional patent applications are hereby incorporated by reference in its entirety.

TECHNICAL FIELD

This disclosure relates generally to multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds are can be used in the immersive environment.

Point clouds are a set of 3D points that represent an objects surface. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be manipulated onto traditional two-dimensional (2D) frames and that can compressed and later be reconstructed and viewable to a user.

SUMMARY

This disclosure provides point cloud compression using continuous surface codes.

In one embodiment, a decoding device for point cloud decoding is provided. The decoding device includes a communication interface and a processor. The communication interface is configured to receive a compressed bitstream. The processor is configured to decode, from the compressed bitstream, a first frame and a second frame that include pixels representing points of a 3D point cloud at different depths. The processor is also configured to decode, from the compressed bitstream, an occupancy map frame. The occupancy map frame indicates whether the pixels included in the first frame and second frame at that position in the occupancy map frame are valid pixels and whether points of the 3D point cloud are positioned between the first frame and the second frame at that position in the occupancy map frame. The processor is configured to generate the 3D point cloud using the first frame, the second frame, and the occupancy map frame.

In another embodiment, an encoding device for point cloud encoding is provided. The encoding device includes a processor and a communication interface. The processor is configured to generate, for a three-dimensional (3D) point cloud, a first frame and a second frame that include pixels representing points in the 3D point cloud at different depths. The processor is configured to generate an occupancy map frame. The occupancy map frame indicates whether the pixels included in the first frame and second frame at that position in the occupancy map frame are valid pixels and whether points of the 3D point cloud are positioned between the first frame and the second frame at that position in the occupancy map frame. The processor is configured to encode the first frame, the second frame, and the occupancy map frame to generate a compressed bitstream. The communication interface is configured to receive a compressed bitstream.

In yet another embodiment a method for point cloud decoding is provided. The method includes receiving a compressed bitstream. The method also includes decoding, from the compressed bitstream, a first frame and a second frame that include pixels representing points of a 3D point cloud at different depths. The method further includes decoding, from the compressed bitstream, an occupancy map frame indicating whether the pixels included in the first frame and the second frame at that position in the occupancy map frame are valid pixels and whether points of the 3D point cloud are positioned between the first frame and the second frame at that position in the occupancy map frame. The method additionally includes generating the 3D point cloud using the first frame, the second frame, and the occupancy map frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5C illustrates an example block diagram of a decoder in accordance with an embodiment of this disclosure;

DETAILED DESCRIPTION

Figure 1:
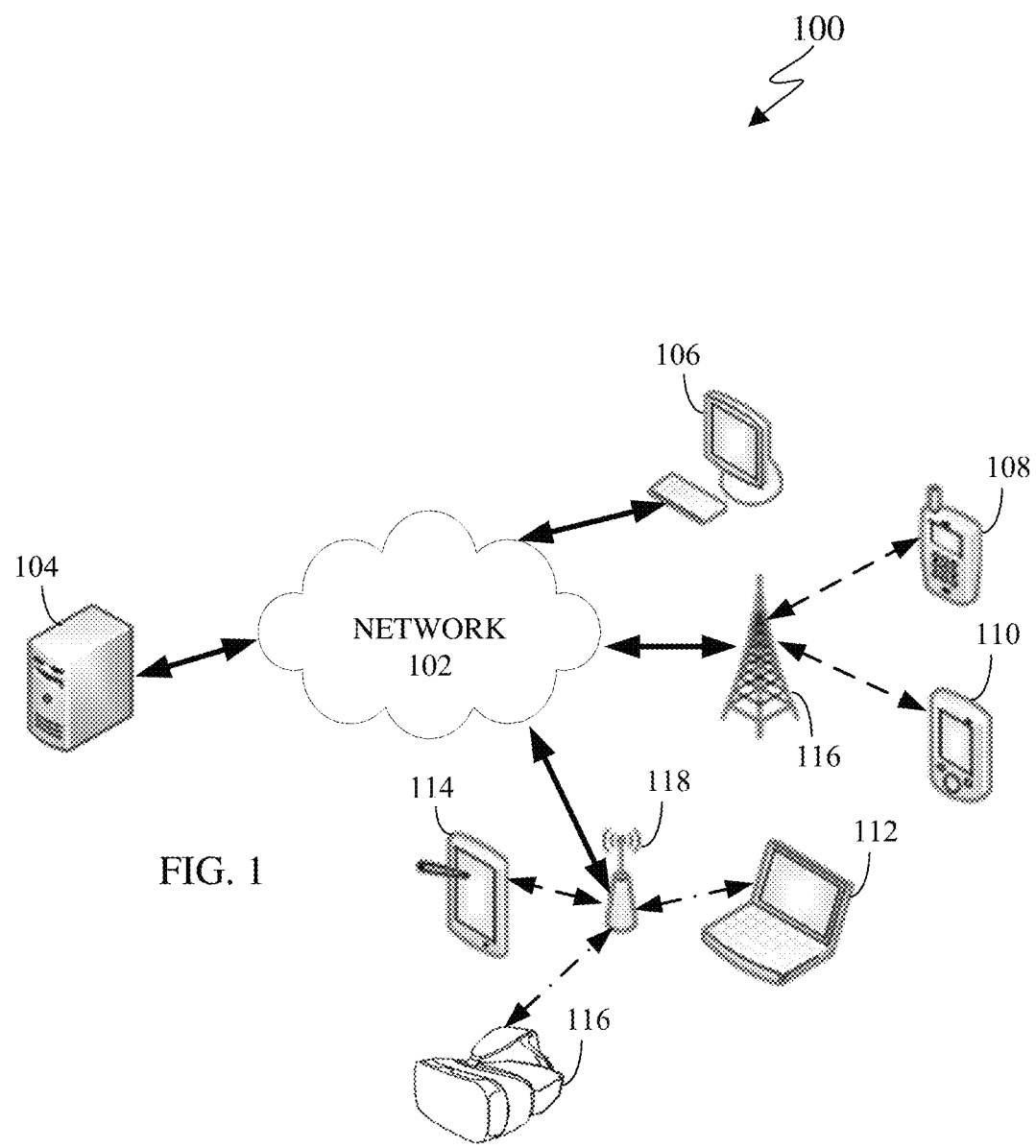
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD is a device that enables a user to view the VR scene and adjust the displayed content based on movements of the head of the user. A HMD represent one of many types of devices that provide AR and VR experiences to a user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point that is positioned in a particular position within 3D space and includes one or more attributes or textures. A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. Point clouds consist of multiple 3D points positioned in 3D space.

Each point in a 3D point cloud includes an attribute such as a geometric position, represented by 3-tuple (X,Y,Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In certain embodiments, the points are positioned throughout the internal structure and external surfaces of the object. Additionally, depending upon the application, each point in the point cloud can also include additional attributes, (also referred to as textures) such as color, reflectance, intensity, surface normal, and the like. In some embodiments, a single point of a 3D point cloud can have multiple attributes. A texture can refer to an attribute other than the geometry attribute. A single point can have multiple attributes. For example, a first attribute can represent the geometric position of a point (such as a location of the point in 3D space), while a second attribute or texture can represent the color of the point, a third attribute or texture can represent the reflectiveness of the point, and yet the point can further include additional attributes or textures such as intensity, surface normal, and the like. In some embodiments, an attribute refers only to a texture of a point, and not a geometric position of the points. In some applications, point clouds can also be used to approximate light field data in which, each point includes multiple view-dependent, color information (R, G, B triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten bit geometric attribute data, per coordinate, and an eight bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D state to a 2D state. In certain embodiments, the conversion of a point cloud includes projecting the clusters of points of the 3D point cloud onto 2D frames by creating patches that represent the point cloud. Thereafter, video codecs such as HEVC, AVC, VP9, VP8, JVNET, and the like can be used to compress the 2D frames representing the 3D point cloud similar to a 2D video.

Figure 4A:
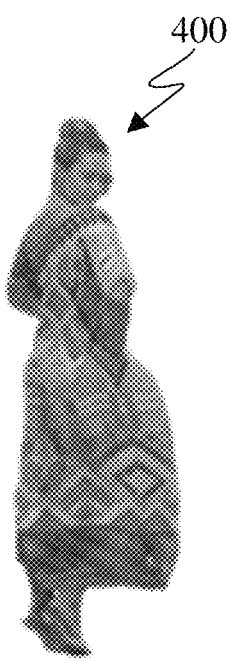
FIGS. 4A, 4B, and 4C illustrate an example 3D point cloud and 2D frames, that represent the 3D point cloud in accordance with an embodiment of this disclosure.
Figure 4B:
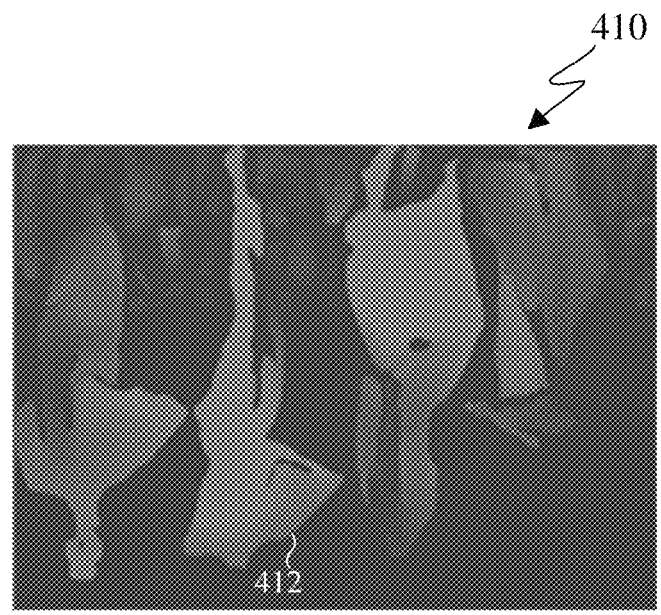
Figure 4C:
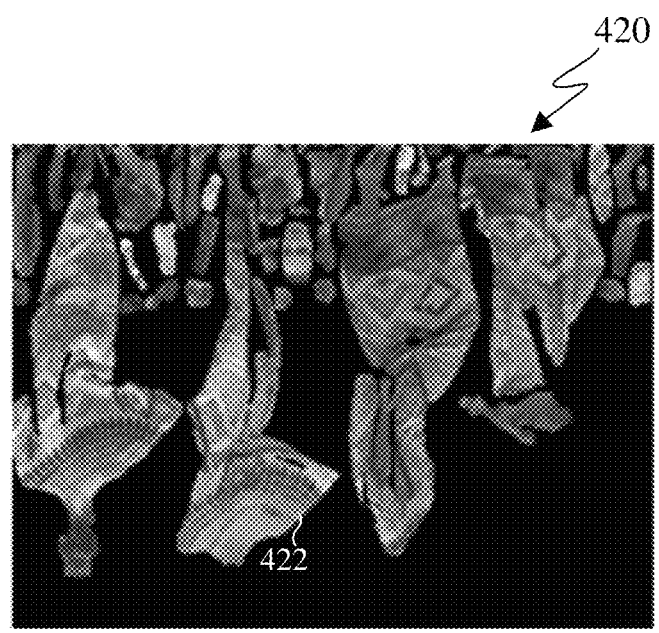

Converting the point cloud includes projecting the point cloud to generate multiple patches and packing the patches onto one or more 2D frames, such that the frames can be compressed, and then transmitted to a display device. The frames can represent projections at different layers of the point cloud. The frames can also represent different attributes or textures of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes.

Embodiments of the present disclosure provide systems and methods for converting a point cloud into a 2D state that can be transmitted and then reconstructed into the point cloud. In certain embodiments, a point cloud is deconstructed into multiple patches, and multiple frames are generated that include the patches. In certain embodiments, a frame includes patches of the same attributes. The points of the 3D point cloud that are represented in one patch in one frame correspond to the same points that are represented in another patch in a second frame. In other embodiments, the patches on one frame represent multiple attributes associated with the points of the point cloud, such as a geometric position of the points in 3D space and color.

An encoder projects the 3D point cloud onto the multiple 2D frames and generates a bitstream. The encoder or another device then transmits the bitstream to different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

During projection the encoder decomposes the point cloud into a set of patches by clustering the points. The geometry and texture information of these patches are packed into geometry video frames and texture video frames, respectively. The geometry video frames are used to encode the geometry information, and the corresponding texture video frames are used to encode the texture (or other attributes) of the point cloud. Each pixel within a patch in the geometry video frame corresponds to a point in 3D space. The two transverse coordinates (with respect to the projection plane) of a 3D point corresponds to the column and row indices in the geometry video frame (u,v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

Projecting a point in 3D space, from a point cloud, onto 2D frames certain points of the 3D point cloud can be missed, and not included in any of the 2D frames. Thereafter, when the point cloud is reconstructed, by the decoder, cracks and holes can be introduced in the reconstructed could cloud, as certain points were not transmitted from the original 3D point cloud. A point is missed when it is not projected from 3D point cloud to a patch on a 2D video frame. Missed points generally occur near regions of high curvature in the point cloud surface or due to self-occlusions. Additionally, some isolated 3D points are not included in the regular patches as these points they fail to comply with the constraints imposed during the projection onto the 2D frames. For example, the constraints can include a maximum depth constraint, distance from other points in the neighborhood, and the like.

If two or more points are projected to the same pixel location, then one of those points can be missed. Since multiple points can be projected to the same pixel location on a 2D frame, multiple projections can be captured at different depths or layers. A near layer, denoted as $D_0$, stores the points which are closest to the projection plane, while a far layer, denoted as $D_1$ stores points a distance from the near layer. Embodiments of the present disclosure recognize and take into consideration that points can still be missed between the near layer $D_0$ and the far layer $D_1$. As such, the location and position of points that are between the near layer $D_0$ and the far layer $D_1$ can be indicated in another frame, such as the occupancy map.

Layers represent different depth values for the same position on the 2D image. For example, if a patch projected onto XY plane, the different layers represent different z values for the patch. In certain embodiments, layers are generated by taking more projections at different depths. The multiple layers represent the same projection but at different depths into the point cloud. A first layer can store values that are closest to the projection plane, while a second layer can store values further from the projection plane.

The far layer $D_1$ is within a predefined distance, referred to as a maximum surface thickness, from the near layer. The encoder sets the maximum surface thickness. In certain embodiments, the maximum surface thickness between the near layer and the far layer is four. The maximum surface thickness is a parameter chosen by the encoder representing the maximum allowable distance between the near layer $D_0$ and the far layer $D_1$. The encoder can use surface thicknesses to limit the maximum difference between consecutive layer depth values.

The actual surface thickness between the near layer $D_0$ and the far layer $D_1$ can be less than or equal to the maximum surface thickness. That is, the far layer $D_1$ can be positioned anywhere between the near layer $D_0$ and the maximum surface thickness. A pixel at (u,v) on the near layer $D_0$ is the nearest point to the projection plane while a pixel at (u,v) on the far layer $D_1$ is the furthest point from the near layer $D_0$ while not positioned beyond the maximum surface thickness parameter. For instance, if a value of a pixel at (u,v) of the near frame $D_0$ is ten and the maximum surface thickness is four, then the value of a pixel at (u,v) of the far frame $D_1$ is between ten and fourteen.

Embodiments of the present disclosure also provide systems and methods for improving the compression, transmission, and reconstruction of a 3D point cloud. Improving the compression of a 3D point cloud reduces the bandwidth required for the transmission as well as reduces the processing power required to reconstruct the 3D point cloud. For example, the transmission of a bitstream can be improved by reducing the information that is transmitted from the encoder to a decoder.

Embodiments of the present disclosure recognize take into consideration that even with two layers, points that fall between the near layer and the far layer could be missed during the projection. For example, a missed points patch (also referred to as an additional points patch or a PCM patch) can be generated to store all three coordinates of each missed points. However, storing all three coordinates for each missed point can consume a significant bandwidth. As such, embodiments of the present disclosure provide for indicating the position and number of points between the near layer and the far layer within the occupancy map.

As discussed in great detail below, when a frame is generated an occupancy map is also generated. Generally, the occupancy map indicates, for each pixel within a frame, whether the pixel is a valid pixel or an invalid pixel. For example, if a pixel in occupancy map at coordinate (u,v) is valid, then the corresponding pixel in a geometry frame or text frame at the coordinate (u,v) is valid. If the pixel in occupancy map at coordinate (u,v) is invalid, then the decoder skips the corresponding pixel in a geometry frame or texture frame at the coordinate (u,v). In certain embodiments, the occupancy map at a position (u,v) can be one or zero. When a pixel at position (u,v) of the occupancy map is not zero indicates that a pixel at (u,v) of an attribute frame is valid. In contrast, when a pixel at position (u,v) of the occupancy map is zero indicates that a pixel at (u,v) of an attribute frame is invalid. According to embodiments of the present disclosure when a pixel at position (u,v) of the occupancy map is greater than or equal to one, indicates whether there are points the respective location of the points between the corresponding pixel at position (u,v) of an attribute frame representing a near layer $D_0$ and a corresponding pixel at position (u,v) of an attribute frame representing a far layer $D_1$.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client device 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
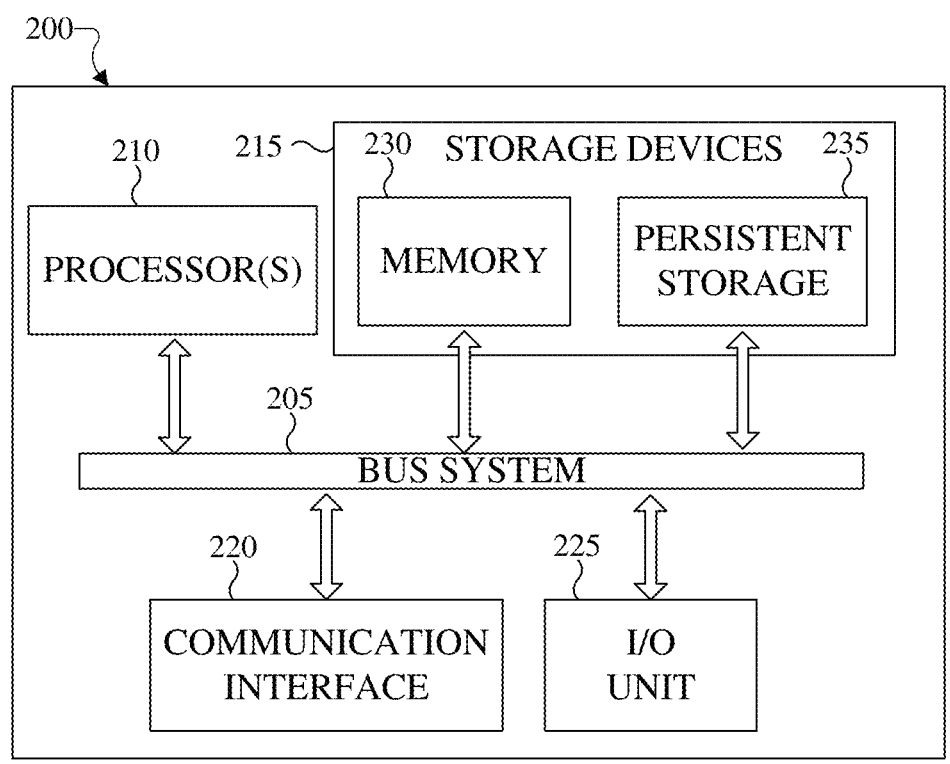
FIGS. 2 and 3 illustrate example electronic devices in accordance with an embodiment of this disclosure.
Figure 3:
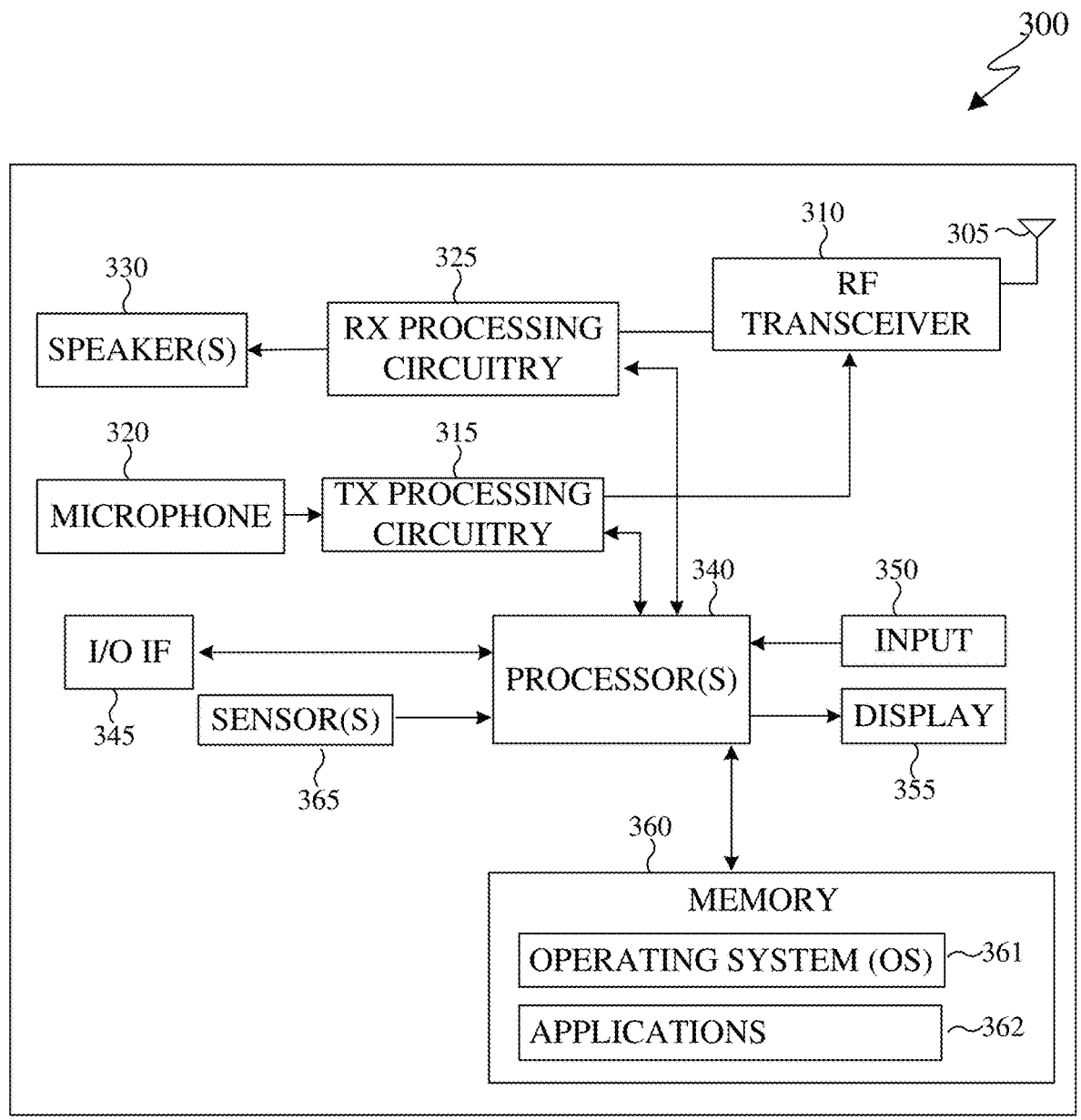

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 can project the point cloud into multiple patches. For example, a cluster of points of the point cloud can be grouped together to generate a patch. A patch can represent a single attribute of the point cloud, such as geometry, color, and the like. Patches that represent the same attribute can be packed into individual 2D frames, respectively. FIGS. 4A-4C, which are described in greater detail below, illustrate a 3D point cloud that is represented by patches on different frames.

The 2D frames are then encoded to generate a bitstream. The frames can be included individually or together. During the encoding process additional content such as metadata, flags, occupancy maps, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, or any combination thereof. A geometry frame can include pixels that indicate geographic coordinates of points of the point cloud in 3D space. Similarly, a color frame can include pixels that indicate the RGB color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, and 4C illustrate an example 3D point cloud and 2D frames that represent the 3D point cloud in accordance with an embodiment of this disclosure. In particular, FIG. 4A illustrates a 3D point cloud 400, and FIGS. 4B and 4C each illustrate a 2D frame that includes patches. The FIG. 4B illustrates a 2D frame 410 that represents the geometric position of points of the 3D point cloud 400. The FIG. 4C illustrates the texture frame 420 that represents the color (or another attribute) associated with points of the 3D point cloud 400. The embodiment of FIGS. 4A, 4B, and 4C, are for illustration only and other embodiments could be used without departing from the scope of this disclosure.

The 3D point cloud 400 is a set of data points in 3D space. Each point of the 3D point cloud 400 includes multiple attributes such as (i) geometric position that provides the structure of the 3D point cloud and (ii) one or more textures that provide information about each point such as color, reflectiveness, material, and the like.

FIGS. 4B and 4C illustrate the 2D frames 410 and 420 respectively. Generally, the attributes of the 3D point cloud 400 are clustered and projected on to different planes. The attributes of the 3D point cloud 400 are projected using a predefined criteria such as normal direction, distance to the projected frames, contiguity, and the like. The different plans can be the XY plane, the YZ plane, or the ZX plane. Each of the clusters corresponds to a patch when projected onto a plane. For example, the geometry frame 410, depicts multiple patches (such as a patch 412) representing the depth values of the 3D point cloud 400. In certain embodiments, the level of illumination of each pixel in the geometry frame 410, indicates the distance that the represented point is from the projection plane. The texture frame 420, depicts multiple patches (such as a patch 422) representing the color of the 3D point cloud 400. The patches (such as the patches 412 and 422) are sorted and packed into a respective 2D frame. For example, the patch 412 is packed into a geometry frame 410, which represents the geometric position of the points of the 3D point cloud 400. Similarly, the patch 422 is packed into the texture frame 420, which represents color of the 3D point cloud 400. That is, each pixel in the texture frame 420 corresponds to a pixel at the same location in the geometry frame 410. For example, a mapping is generated between each pixel in the geometry frame 410 and the texture frame 420. The location of the patches within the 2D frames 410 and 420 can be similar for a single position of the 3D point cloud. Similarly, a coordinate (u,v) of a pixel within the geometry frame 410 corresponds to a similar pixel at the same coordinate (u,v) in the texture frame 420. As the 3D point cloud 400 changes, new frames can be generated with different patches based on the new position the 3D point cloud.

Since there could be multiple points being projected to the same pixel, two layers or images are considered for patch projection. Near layer stores the points which are closest to the projection plane, while far layer stores the points farthest away from the projection plane which lie within the predefined parameter from the near layer. The predefined parameter is the maximum surface thickness, which is described in greater detail below. In certain embodiments, the near layers are stored in one frame and the far layers are stored in a separate frame. In other embodiments, the near layer and the far layer are stored in the same frame. The frames are then encoded with a video codec such as HEVC, AVC, VP9, VP8, JVET, AVC, and the like. A decoder can receive the frames and reconstructs and colors the point cloud. During lossless coding, two layers are not sufficient to capture the multiple points being projected on the same pixel. A PCM code is used to indicate the points in the point cloud that lie between the near and far layer. In practice the surface between the near and far layer is filled with additional points. As such, embodiments of the present disclosure provide signaling methods to indicate when the surface between the near and far layer is filled.

Figure 4D:
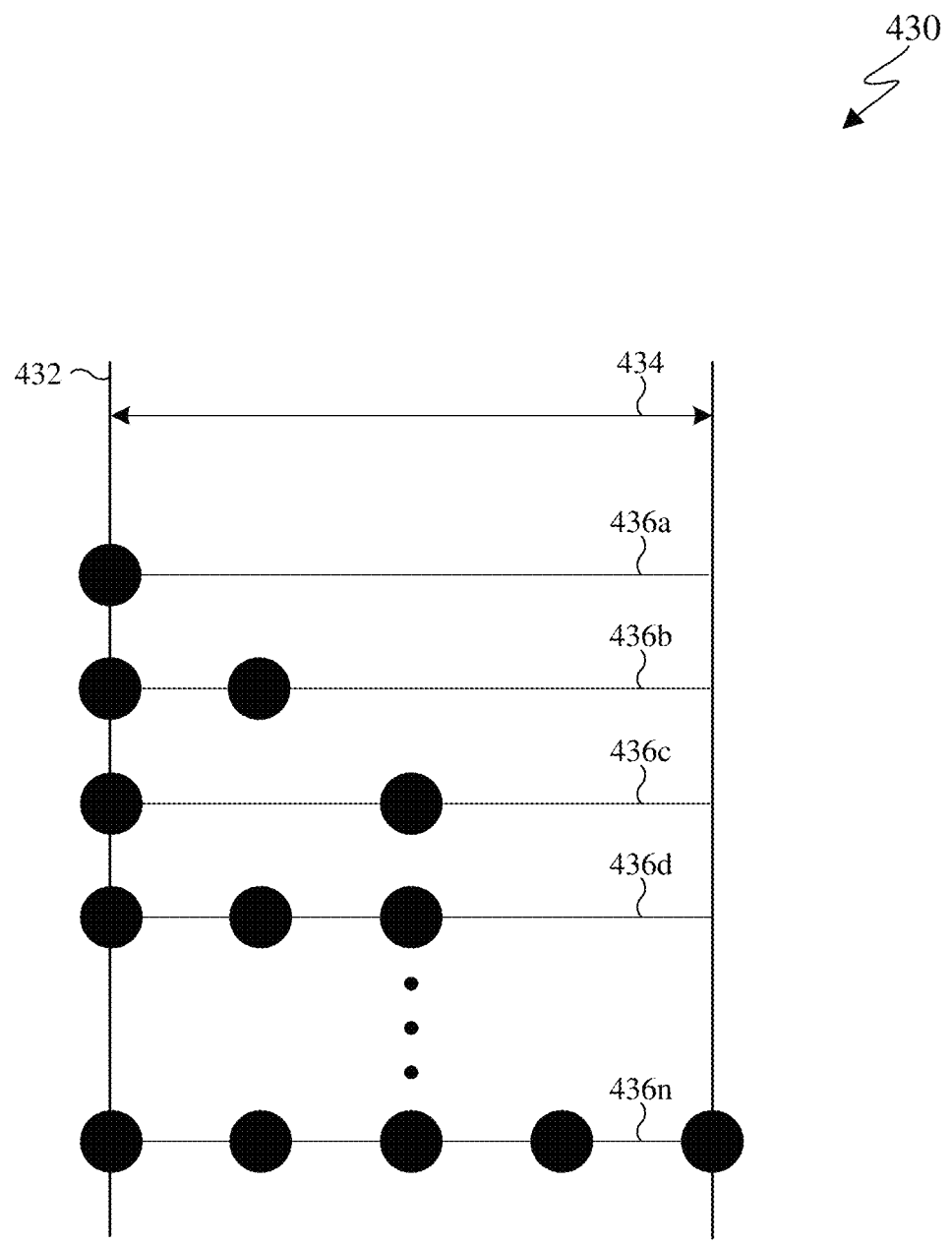
FIG. 4D illustrates an example diagram of points located between a near layer and a far layer in accordance with an embodiment of this disclosure.

FIG. 4D illustrates an example diagram of points located between a near layer and a far layer in accordance with an embodiment of this disclosure. For example, the geometry frame 410 could represent a projection at a near layer $D_0$. Another frame (not shown) can be generated representing points at a distance from the geometry frame 410. In another example, the geometry frame 410 can include patches taken from the near layer $D_0$ and the far layer $D_1$. The distance between the near layer and the far layer is within the maximum surface thickness. Points can be located between the near frame $D_0$ and the far frame $D_1$. Similarly, points can be located beyond the far frame. When points are located further than the far frame, those points can be captured in another layer or in a missed points patch.

FIG. 4D illustrates multiple points positioned on or between the near layer 432 and the far layer within the maximum surface thickness 434. An encoder can generate a PCM code that indicates the quantity of points and the position of each point between the near layer 432 and the far layer. The near layer 432 is denoted as $D_0$ while the far layer is denoted as $D_1$. It is noted that the maximum surface thickness is four, since the far layer is a maximum distance of four points from the near layer 432, as shown in line 436*n*.

When the actual surface thickness is zero, such as in line 436*a*, indicates that the near layer 432 and the far layer contain the same point. The encoder can generate a PCM code that indicates that that the near layer 432 and the far layer contain the same point.

When the actual surface thickness is one, as shown in line 436*b*, indicates that both the near layer and the far layer include a point. The encoder can generate a PCM code that indicates that that the near layer 432 and the far layer contain a point, and that the surface thickness is 1, such that no points can be positioned between the near layer and the far layer.

When the actual surface thickness between the near layer 432 and the far layer is two, such as in lines 436*c* and 436*d*. The encoder can generate a PCM code of a first value that indicates that there is no other point in between the near layer 432 and the far layer. Similarly, the encoder can generate a PCM code of a second value that indicates that the near layer 432 and the far layer each contain a point and that there is an additional point in between the near layer 432 and the far layer. Line 436*d* can be referred to as a continuous surface as points occupy continuous positions between the near layer 432 and the far layer.

Line 436*n* represents the near layer 432 and the far layer, where the far layer is at the maximum surface thickness. The line 436*n* includes points at every position between the near layer 432 and the far layer. In other embodiments, not shown, there can be no points between the near layer 432 and the far layer. Similarly, in other embodiments, not show, there can be one point, two points, or three points at various positioned between the near layer 432 and the far layer. The encoder can generate various PCM codes which specify the number of points between the near layer 432 and the far layer, as well as the location of the points between the near layer 432 and the far layer. The near layer 432 and the far layer represent distance distances from the projection plane.

In certain embodiments, a PCM code is a numerical integer, such as zero, one, two, three, and the like. The numerical integer when represented as a binary code represents the placement or absence of the points between the near layer and the far layer. The occupancy map, described in great detail in FIGS. 5B and 5C below, is modified to include the PCM code. The modified occupancy map can signal whether any positions between the near layer 432 and the far layer are occupied.

Although FIGS. 4A, 4B, 4C, and 4D illustrate example point cloud and 2D frames representing a point cloud various changes can be made to FIGS. 4A, 4B, and 4C, and 4D. For example, the point cloud and point mesh represent a single object, whereas in other embodiments, a point cloud or point mesh can represent multiple objects, scenery (such as a landscape), a virtual object in AR, and the like. In another example, the patches included in the 2D frames can represent other textures, such as luminance, material, and the like. With respect to FIG. 4D, the maximum surface thickness between the near layer and the far layer can be any number. Similarly, the quantity and placement of the points between the near layer and the far layer can change. FIGS. 4A, 4B, 4C, and 4D do not limit this disclosure to any particular 3D object(s) and 2D frames representing the 3D object(s).

Figure 5A:
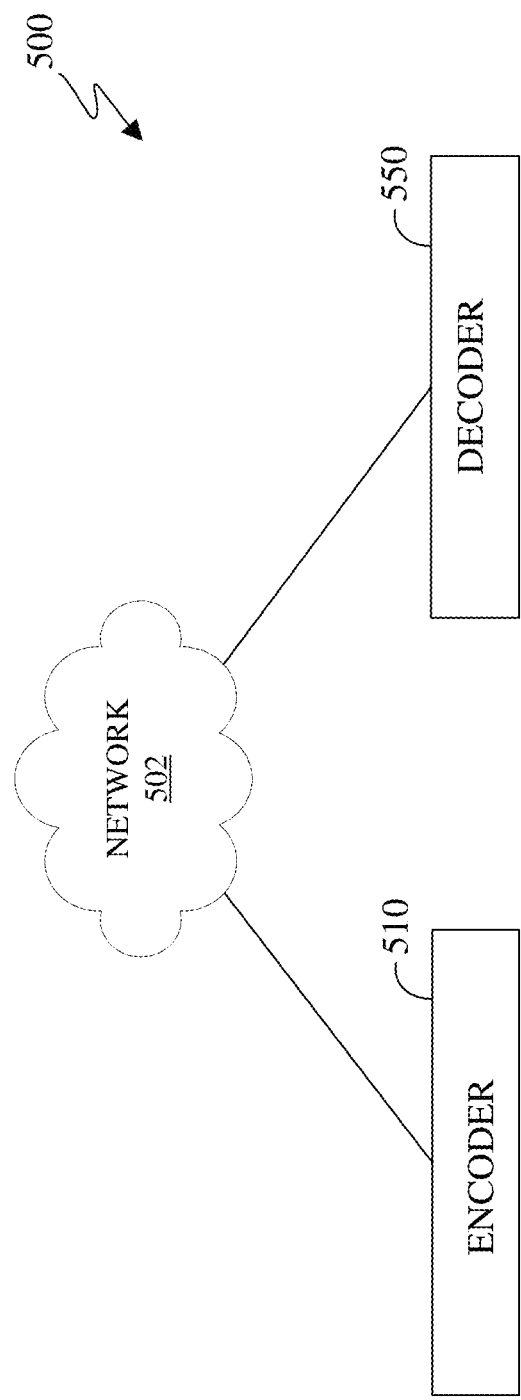
FIG. 5A illustrates a block diagram of an example environment-architecture in accordance with an embodiment of this disclosure.
Figure 5B:
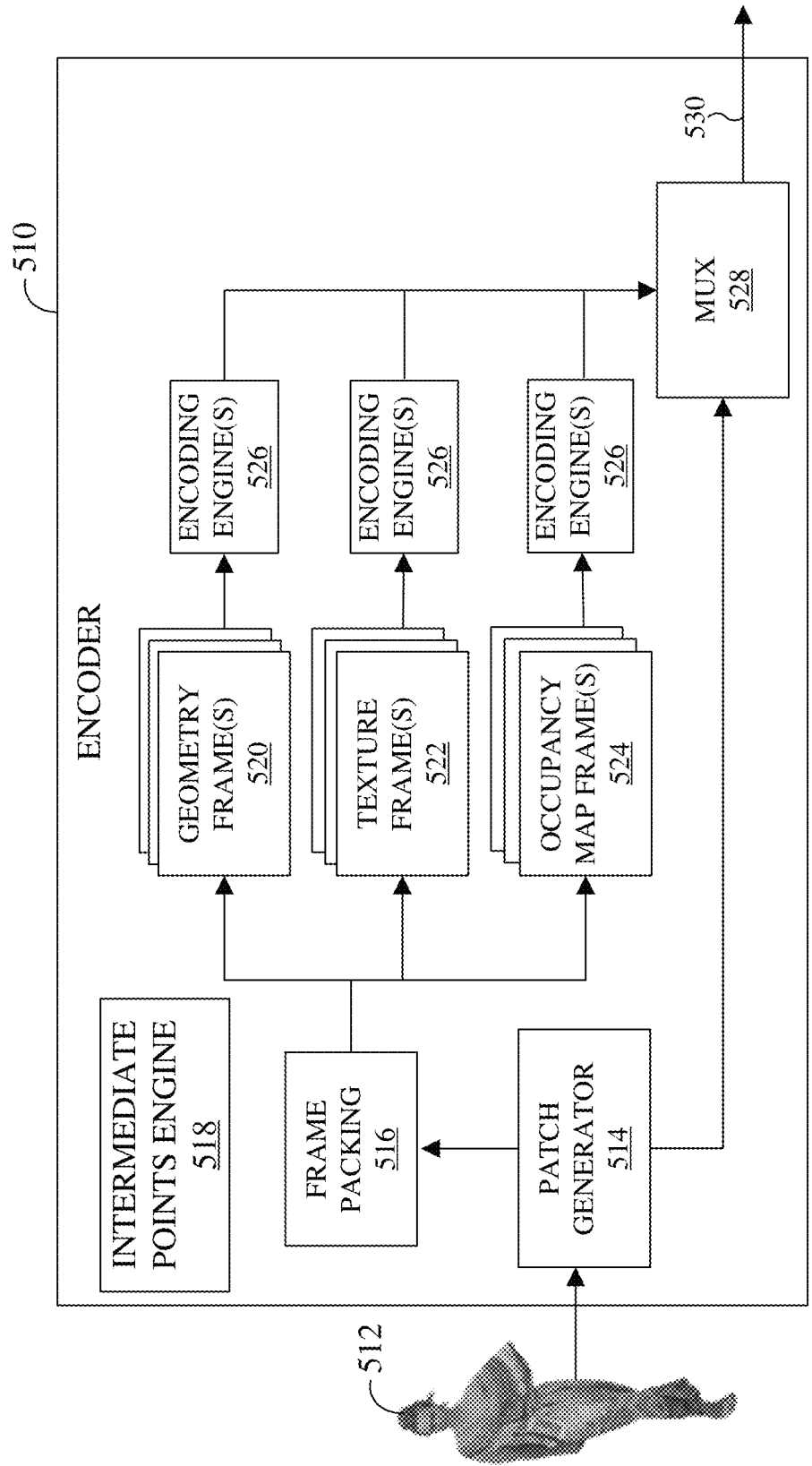
FIG. 5B illustrates an example block diagram of an encoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receive 3D media content, such as a point cloud, from another device such as a server (similar to the server 104 of FIG. 1, the server 200 of FIG. 2) or an information repository (such as a database). In certain embodiments, the encoder 510 can receive media content from multiple cameras and stitch the content together to generate a 3D scene that includes one or more point clouds.

In certain embodiments, the encoder 510 projects a point cloud into two dimensions which create patches that represent the projection. The encoder 510 clusters points of a point cloud into groups which are projected onto different planes such as an XY plane, an YZ plane, and an XZ plane. Each cluster of points is represented by a patch when projected onto a plane. It is noted, that a point of the 3D point cloud is located in 3D space based on a (X,Y,Z) coordinate value. When the point is projected onto a 2D frame the pixel, representing the projected point, is denoted by the column and row index in the frame indicated by the coordinate (u,v). Additionally, 'u' and 'v' can range from zero to the number of rows or columns in the depth image, respectively.

In certain embodiments, the encoder 510 can project points at different surface distances from the projection plane. For example, a layer that is near the projection plane can be stored on a frame denoted as $D_0$ and a layer that is further from the projection plan can be stored on a frame denoted at $D_1$. The encoder 510 packs the cluster of points or patches representing the point cloud onto 2D video frames. After the points of the point cloud are projected onto a 2D frame, the points are referred to as pixels or points interchangeably. Each video frames represents a particular attribute, such as one set of frames can represent geometry and another set of frames can represent a texture. It should be noted that additional frames can be generated based on more layers as well as each additionally defined texture.

The frames representing different layers can be denoted as $D_0$ and $D_1$, where $D_0$ represents a frame including points from the first layer (or near layer) while $D_1$ represents a frame including points from the second layer (or far layer). In certain embodiments, the layer $D_0$ and the layer $D_1$ are included in a single frame. A pixel at location (u,v) in a D0 frame and a pixel at the same location (u,v) in a D1 frame represent depth values of the same position. The surface thickness limits the maximum difference between consecutive layer depth values. In certain embodiments, additional notations can be used to indicate each additional layer. The examples below can be expanded to include three or more layers. As used herein $D_0$ and $D_1$ can indicate a geometry frame as well as a texture frame.

The encoder 510 can also generate a PCM code that indicates the number of points that are positioned between a frame representing the near layer and a frame presenting the far layer. The PCM code also indicates the position of the points between a frame representing the $D_0$ and a frame presenting the $D_1$. Depending on the number of points positioned between the $D_0$ and $D_1$, the PCM code is used to indicate the number and placement of the points between the two layers.

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550 can receive a bitstream that represents media content, such as a point cloud. The bitstreams can include data representing a 3D point cloud. In certain embodiments, the decoder 550 can decode the bitstream and generate multiple frames such as the near layer frame, the far layer frame, and the occupancy map. The decoder 550 inspects the occupancy map frame to identify whether a pixel on one of the frames is a valid pixel (the pixel corresponds to a point of the 3D point cloud) or an invalid pixel (the pixel does not correspond to any point of the 3D point cloud). The decoder 550 also identifies from the occupancy map whether points are positioned between the near layer $D_0$, and the far layer, $D_1$. When points are positioned between the near layer $D_0$, and the far layer, $D_1$, the decoder reconstructs the points cloud and places the points in the corresponding location in 3D space. The decoder 550 is described with more below in FIG. 5C.

FIG. 5B illustrates the encoder 510 that generates a bitstream 530 that includes data representing a received point cloud 512. The bitstream 530 which can include multiple bitstreams and can be transmitted via the network 502 of FIG. 5A to another device, such as the decoder 550. The encoder 510 can identify points between a near a far layer of projection and signal the number and placement of the points within the occupancy map. The encoder 510 includes a patch generator 514, a frame packing 516, an intermediate points engine 518, various frames (such as one or more geometry frames 520, one or more texture frames 522, and one or more occupancy map frames 524), one or more encoding engines 526, and a multiplexer 534.

The point cloud 512 can be stored in memory (not shown) or received from another electronic device (not shown). The point cloud 512 can be a single 3D object, or a grouping of 3D objects. The point cloud 512 can be stationary object or an object which moves.

The patch generator 514 generates patches by taking projections of the point cloud 512. In certain embodiments, the patch generator 514 splits the geometry attribute and each texture attribute of each point of the point cloud 512. The patch generator 514 can use two or more projection planes, to cluster the points of the point cloud 512 to generate the patches. The geometry attribute and each texture attribute are eventually packed into respective geometry frames 520 or the texture frames 522.

For each input point cloud, such as the point cloud 512, the geometry attribute and one or more texture attributes (such as color) are clustered using one or more criteria. The criteria include a normal direction, a distance to projected frames, contiguity, and the like. After the points are clustered, the geometry attribute and a corresponding texture attribute for each point are projected onto planes, such as the XY plane, the YZ plane, or the XZ plane.

When projected, each cluster of points of the point cloud 512 appears as patch. Each a patch (also referred to as a regular patch) represents a particular attribute of the point cloud. For example, a single cluster of points can be represented as multiple patches on multiple frames, where each patch represents a different attribute. It is noted that patches representing different attributes of the same cluster of points include a correspondence or a mapping, such a pixel in one patch corresponds to the same pixel in another patch.

In certain embodiments, multiple frames of the same 3D point cloud using two or more projection planes can be generated. In certain embodiments, the patch generator 514 splits geometry aspects of each point of the point cloud 512 and the texture components of each point of the point cloud 512, which are placed on respective geometry frames 520 or the texture frames 522.

The frame packing 516 sorts and packs the patches (both the geometry and texture patches) into respective frames, such as the geometry frames 520 and the texture frames 522. As illustrated in FIGS. 4B and 4C, the frame packing 516 organizes the by attributes and places the patches within corresponding frames, such as the patch 412 is included in the geometry frame 410 and the patch 422 is included in the texture frame 420. The frame packing 516 also generates one or more occupancy map frames 524 based on the placement of the patches within the geometry frames 520 and the texture frames 522.

The intermediate points engine 518 identifies whether there are points of the point cloud 512 that were not included in any of the patches. For example, points that are not included in any of the patches can be isolated, such that they are not near a cluster of points that are projected onto a frame. For another example, points that are not included in any of the patches can be positioned between the layers of the projection. For example, line 436*d* of FIG. 4D illustrates a point on the near layer 432 and a point on the far layer and a point in between the near layer 432 and the far layer. The in between point can be considered a missed point as it was not originally projected onto a frame.

In certain embodiments, the intermediate points engine 518 identifies points of the point cloud 512 that are not represented in any of the patches generated by the patch generator 514. For points that are not positioned between the near layer and the far layer, the intermediate points engine 518 generates a missed points patch. The additional points patch can include all three geometric coordinates and color components of the point in stored in the geometry frames 520, and the texture frames 522. For example, the geometry of the additional points can be stored as an additional points patch in the geometry frame 520. Similarly, a texture (such as color) of the additional points can be stored as an additional points patch in the texture frame 522. For points that are positioned between the near layer and the far layer, the intermediate points engine 518 generates values to be included in the occupancy map frames 524. The quantity and position of the points between the near layer and the far layer can then be identified in the occupancy map frames 524.

For example, when the frame packing 516 generates the occupancy map frames 524, the occupancy map frames include a value of zero or one for each pixel. When a pixel of the occupancy map at position (u,v) is a value of zero, indicates that the pixel at (u,v) in the geometry frame 520 and the texture frame 522 are invalid. As such, there are no points positioned between the near layers and the far layer, and the intermediate points engine 518 does not modify the occupancy map at pixel (u,v).

Similarly, when a pixel of the occupancy map at position (u,v) is a value of one indicates that a corresponding pixel at position (u,v) in the geometry frame 520 and the texture frame 522 are valid. The intermediate points engine 518 then determines whether a difference between a pixel at (u,v) in the $D_1$ frame and a pixel at (u,v) in the $D_0$ frame is greater than one. When the difference between a pixel in the $D_1$ frame and a pixel in the $D_0$ frame is less than or equal to one, the intermediate points engine 518 does not modify the occupancy map at pixel (u,v).

When the difference between a pixel in the $D_1$ frame and a pixel in the $D_0$ frame is greater than one, the intermediate points engine 518 modifies the occupancy map at pixel (u,v).

That is, for a pixel at location (u,v) of one of the occupancy map frames 524, if the pixel is greater than or equal to a value of one, then that pixel corresponds to a point in the point cloud 512 and indicates the number of placement of the points positioned between $D_0$ and $D_1$. In certain embodiments, a value of one indicates that the points are continuous between $D_0$ and $D_1$, such that each position between $D_0$ and $D_1$ is occupied. The intermediate points engine 518 generates a PCM code that indicates the position of points between a pixel at $D_0(u,v)$ and $D_1(u,v)$. The PCM code is not added to the occupancy map value. Rather the occupancy map value is modified based on Equation (1) and Equation (2), below. It is noted that the occupancy map value is modified, based on Equations (1), (2), and (3) only when the difference between $D_0$ and $D_1$ is greater than one (such as when $D_1-D_0>1$).

Occupancy Map$_{New}(u,v)=2^{(N-1)}$-PCM Code     Equation (1)

$N=D_1-D_0$     Equation (2)

Number of spaces between $D_1$ and $D_0=N-1$     Equation (3)

As described in Equation (1) and Equation (2), the new occupancy map value is based on the difference between the depth frames and PCM code. Equation (3) describes the number of positions between $D_0$ and $D_1$ where points can be located, is based on the difference between $D_0$ and $D_1$. The PCM code represents the quantity and position of points between $D_0$ and $D_1$. The PCM code is described in greater detail in FIGS. 6A and 6B, below.

The value of the PCM code is the smallest when all of the points between $D_0$ and $D_1$ are filled in, such as in lines 436d and 436n of FIG. 4D. In contrast, the value of the PCM code is the largest for the case when there is a space for points between $D_0$ and $D_1$, but there are no points located between the two frames, such as in line 436c of FIG. 4D.

Maximum value of the PCM code= $2^{(Max\ surface\ Thickness-1)}-1$     Equation (4)

Equation (4) describes the largest value of the PCM code. For example, the largest value of the PCM code is limited by the distance between the $D_0$ frame and the $D_1$ frame. Equation (4) describes that the maximum value of N-1 is the maximum surface thickness -1. For example, if the surface thickness is four, but the difference between the $D_0$ frame and the $D_1$ frame is three, then the value of the PCM code cannot exceed the value of three which would correspond to the scenario that no points are positioned between the $D_0$ frame and the $D_1$ frame.

The numeric value of the PCM code (see column 604 of FIG. 6A) changes based on the number of points and their location between the $D_0$ frame and the $D_1$ frame. For example, the more points positioned between the $D_0$ frame and the $D_1$ frame yields the smaller the number, while the fewer points positioned between the $D_0$ frame and the $D_1$ frame yields a larger number. The size of the number is inversely related to the number of points between the $D_0$ frame and the $D_1$ frame since there is a higher likelihood that at least one point is positioned between a point on the $D_0$ frame and a point on the $D_1$ frame corresponding to the same position (u,v), than no points positioned between a point on the $D_0$ frame and a point on the $D_1$ frame corresponding to the same position (u,v). For example, when (i) N is three (based on Equation (2) and indicates that there are two places that points can be positioned between the $D_0$ frame and the $D_1$ frame) and (ii) the occupancy map includes a PCM code of one, (which corresponds to a binary code of 0b11) indicates that all the points between the a point at the position (u,v) in the $D_0$ frame and a corresponding point at the position (u,v) in the $D_1$ frame are filled in. As the actual surface thickness changes, the PCM code is represented by a different number of bits. In the previous example, when the actual surface thickness is three, the PCM code is represented by 2 bits.

The length of the PCM code when represented as a binary code (see column 602 of FIG. 6A), changes based on the value of a pixel at position (u,v) in the $D_0$ frame and the $D_1$ frame. For example, if the difference between a pixel at $D_1(u,v)$ and $D_0(u,v)$ is three there are two positions where points can be located between $D_0$ and $D_1$. It is noted that, three would correspond to the variable N of Equation (1) and Equation (2). When N is three, there are two positions that points can be located between $D_0$ and $D_1$. The value of one less than the actual surface thickness between the two layers indicates the length of the PCM code in binary format.

In certain embodiments, the presence of a continuous surface between the two layers is signaled by a flag in metadata, and points that are partially filled can be transmitted separately via a missed points patch. A continuous surface is identified when all of the positions between the near layer and the far layer are filled with points.

In certain embodiments, during lossy coding, the intermediate points engine 518 can assign a value of zero, one, or two, to the pixels in an occupancy map frame 524. A value of zero assigned at a position (u,v) of the occupancy map frame 524 indicates that the position in the geometry frame 520 is unoccupied. A value of one, assigned at a position (u,v) of the occupancy map frame 524 indicates that the position in the geometry frame 520 is occupied but the surface between $D_0$ and $D_1$ is not completely filled. A value of two, assigned at a position (u,v) of the occupancy map frame 524 indicates that the position in the geometry frame 520 is occupied and the surface between $D_0$ and $D_1$ is fully filled.

Assigning a value of zero, one, or two, to the pixels in an occupancy map frame 524 occurs for occupancy precision of one so that the size of the occupancy map is the same as the size of the depth images. Since the information about the surface being filled or not is contained in the occupancy map, no additional changes are made to the depth images. In certain embodiments, when the occupancy map value is two, no color information about the points between $D_0$ and $D_1$ is stored and the prediction of these color values is done based on nearest neighbor interpolation. For example, the predictions of missing color values can be done based on other interpolation methods, such as bilinear interpolation.

The geometry frames 520 (as illustrated by the geometry frames 410 of FIG. 4B) represent the geographic location of each point of the point cloud 512. The geometry frames 520 include pixels representing the geometry values of the point cloud 512. The pixels representing the geometry values of the point cloud 512 are grouped into patches that represent a cluster of points of the point cloud 512.

The texture frame 522 (as illustrated by the texture frame 420 of FIG. 4C) represents a single attribute of the point cloud 512, such as color. The texture frames 522 include pixels representing values of a particular texture of the point cloud 512. The pixels representing the texture values of the point cloud 512 are grouped into patches that represent a cluster of points of the point cloud 512.

Each geometry frame 410 has at least one corresponding texture frame 420. For example, if the geometry frame 410 indicates where each point of the 3D point cloud 400 is in 3D space, then the corresponding texture frame 420 can indicate the color of each corresponding point. In certain embodiments, additional frames can be generated that represent the other attributes. For example, if another set of frames are generated, such as reflectance frames (not shown) then the corresponding reflectance frame indicates the level of reflectance of each corresponding point within a corresponding geometry frame 520 and a corresponding texture frame 522.

In certain embodiments, one of the occupancy map frames 524 corresponds to the both a geometry frame 520 and a texture frames 522. The occupancy map frames 524 represent occupancy maps that indicate the valid pixel location in the frames (such as the geometry frames 520 and the texture frames 522). The valid pixels are the actual points of the point cloud 512 which are projected into patches (via the patch generator 514) and packed into respective frames (via the frame packing 516). For example, when the pixel at (u,v) is zero, indicates that the pixel at the same location in the geometry frame 520 is invalid. An invalid pixel in a geometry frame 520 or the texture frame 522 indicates that the pixel does not provide information that is used when reconstructing the point cloud. The invalid pixels of the geometry frame 520 and texture frame 522 are pixels that do not correspond to a point of the point cloud. Alternatively, when the pixel at (u,v) is greater than zero, indicates that the pixel at the same location in the geometry frame 520 is valid. Moreover, depending on the value of the pixel at (u,v) in the occupancy map indicates the quantity of points between $D_0$ and $D_1$ as well as the position of the points between $D_0$ and $D_1$.

The encoding engines 526 encode the geometry frames 520, the texture frames 522, and the occupancy map frames 524. In certain embodiments, the frames (such as the geometry frames 520, the texture frames 522, and the occupancy map frames 524) are encoded by independent encoders. For example, one encoding engine 526 can encode the geometry frames 520, another encoding engine 526 can encode the texture frames 522, and yet another encoding engine 526 can encode the occupancy map frames 524. In certain embodiments, the encoding engines 526 can be configured to support an 8-bit, a 10-bit, a 12-bit, a 14-bit, or a 16-bit, precision of data. The encoding engine 526 can be a video or image codec such as HEVC, AVC, VP9, VP8, JVNET, and the like to compress the 2D frames representing the 3D point cloud.

The multiplexer 534 combines the multiple frames (such as the geometry frames 520, the texture frames 522, and the occupancy map frames 524) which are encoded, to create a bitstream 530.

FIG. 5C illustrates the decoder 550 that includes a demultiplexer 552, one or more decoding engines 560, and a reconstruction engine 564. The decoder 550 receives a bitstream 530, such as the bitstream that was generated by the encoder 510. The demultiplexer 552 separates bitstream 530 into one or more bitstreams representing the different frames. For example, the demultiplexer 552 separates various streams of data such as the geometry frame information 554 (originally the geometry frames 520 of FIG. 5B), texture frame information 556 (originally the texture frames 522 of FIG. 5B), and the occupancy map information 558 (originally the occupancy map frames 524 of FIG. 5B).

The decoding engines 560 decode the geometry frame information 554 to generate the geometry frames 520. The decoding engines 560 decode the texture frame information 556 to generate the texture frames 522. Similarly, the decoding engines 560 decode the occupancy map information 558 to generate the occupancy map frames 524. In certain embodiments, a single decoding engine 560 decodes the geometry frame information 554, the texture frame information 556, and the occupancy map information 558.

After the geometry frame information 554, the texture frame information 556, and the occupancy map information 558 are decoded, the reconstruction engine 564 generates a reconstructed point cloud 566 by reconstructing the decoded geometry frame information 554, the decoded texture frame information 556, and the decoded occupancy map information 558. The reconstructed point cloud 566 is similar to the point cloud 512.

The reconstruction engine 564 receives $D_0(u,v)$ and $D_1(u,v)$ values from the decoded geometry frame. The reconstruction engine 564 the reconstructs the points of the point cloud 566 that correspond to the depth values $D_0$ and $D_1$. If the difference between $D_1(u,v)$ and $D_0(u,v)$ is greater than one, then the reconstruction engine 564 derives the PCM code, as described in Equation (5) below. The PCM code indicates the quantity and the position of the points between the reconstructed points corresponding to $D_0$ and $D_1$. Equation (5) describes that the PCM code is based on the number of positions between $D_0$ and $D_1$ and the value of the pixel in the occupancy map.

$$\text{PCM Code} = 2^{(N-1)} - \text{Occupancy Map}_{New}(u,v) \quad \text{Equation (5)}$$

For example, when reconstructing the point cloud, the reconstruction engine 564 inspects the pixels included in the occupancy map information 558 to determine whether a pixel at (u,v) of the one of the frames is valid or invalid. When the pixel is valid, the reconstruction engine 564 determines the quantity and position of points between the near layer and the far layer, based on the value of the pixel.

In certain embodiments, the reconstruction engine 564 converts the PCM code to an Extended Delta Depth Code (EDD code). For example, when the difference between $D_0$ and $D_1$ is greater than one, then the EDD code is either (i) the PCM code or (ii) $1<<(D_0(u,v)-D_1(u,v)-1)$, where $<<$ denotes a left shift. When the PCM code is converted to the EDD code, during lossless coding, the maximum value of $(D_1(u, v)-D_0(u, v))$ is bounded by surface thickness. If the maximum surface thickness is set to eight, then an HEVC coder operating on 8-bit input can code the occupancy map.

Although FIGS. 5A-5C illustrates one example of a transmitting a point cloud various changes may be made to FIG. 5A-5C. For example, additional components can be included in the encoder 510 and the decoder 550.

Figure 6A:
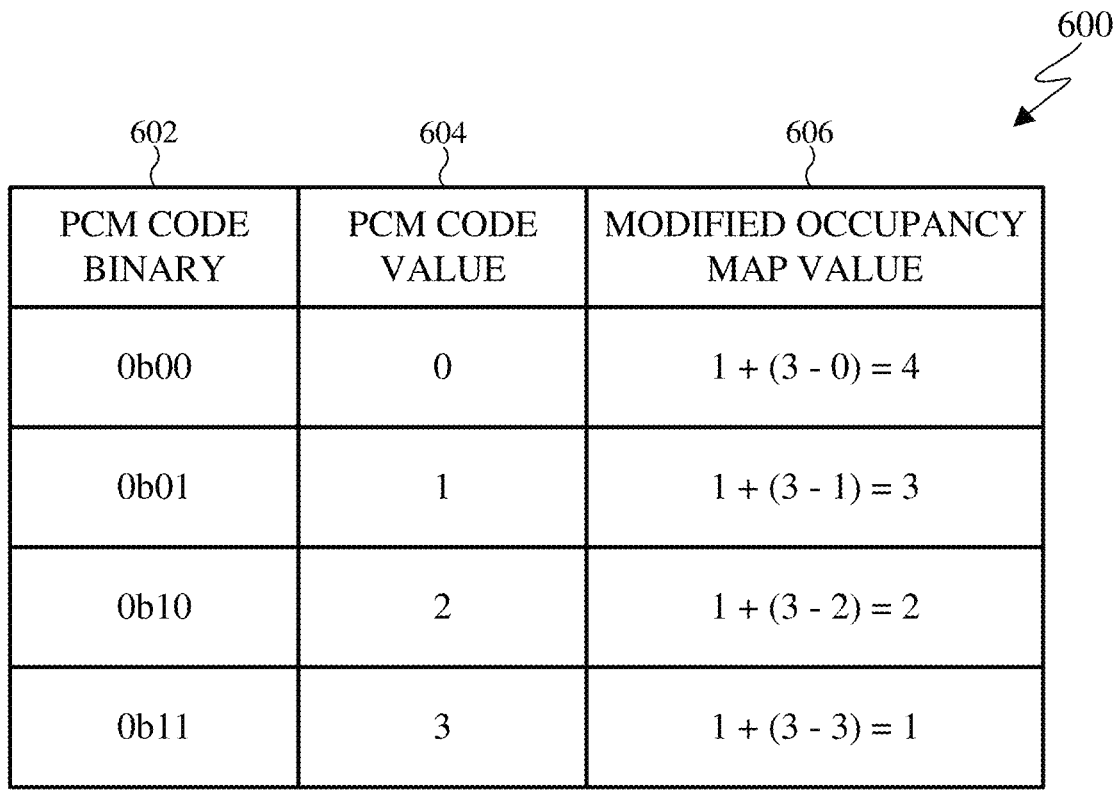
FIG. 6A illustrates an example table describing the occupancy map in accordance with an embodiment of this disclosure.
Figure 6B:
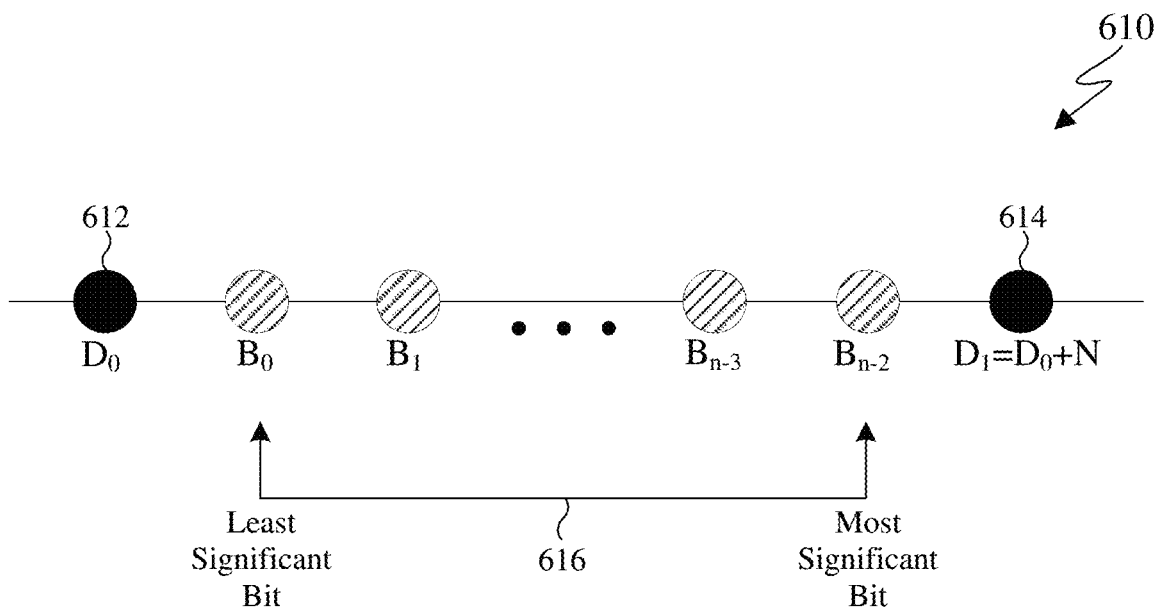
FIG. 6B illustrates an example diagram of the importance assigned to various points between a near layer and a far layer in accordance with an embodiment of this disclosure.
Figure 6C:
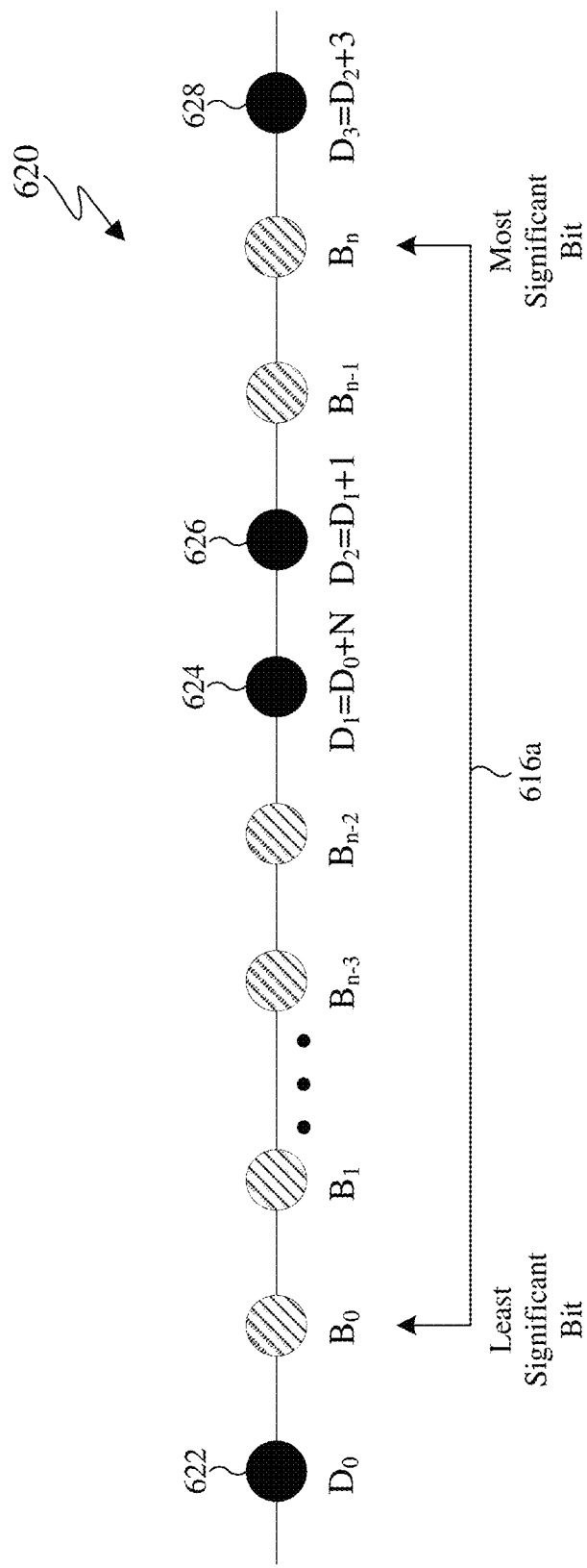
FIG. 6C illustrates an example diagram of the importance assigned to various points when more than two layers are present in accordance with an embodiment of this disclosure.

FIG. 6A illustrates an example table 600 describing the occupancy map in accordance with an embodiment of this disclosure. FIG. 6B illustrates an example diagram 710 of the importance assigned to various points between a near layer and a far layer in accordance with an embodiment of this disclosure. FIG. 6C illustrates an example diagram of the importance assigned to various points when more than two layers are present in accordance with an embodiment of this disclosure. The embodiment of FIGS. 6A, 6B, and 6C are for illustration only and other embodiments could be used without departing from the scope of this disclosure.

The table 600 illustrates example values that can be stored in the occupancy map at a location (u,v) when the pixel at (u,v) corresponds to a valid pixel in another frame, such as the geometry frame 520 and the difference between a pixel at (u,v) in a far layer frame $D_1$ and a pixel at (u,v) in near layer frame $D_0$ is greater than one. Table 600 is based on the example of when the difference between a pixel at $D_1(u,v)$ and $D_0(u,v)$ is three and the maximum surface thickness is four. When the difference between a pixel at $D_1(u,v)$ and $D_0(u,v)$ is three, there are two positions between the near layer and the far layer that could have points.

A PCM code 702 of 0b00 corresponds to a PCM code value of zero. A PCM code 702 of 0b01 corresponds to a PCM code value of one. A PCM code 702 of 0b10 corresponds to a PCM code value of two. A PCM code 702 of 0b11 corresponds to a PCM code value of three. The orientation of the zeros and ones within the PCM code indicates the placement of points between the $D_0$ layer and the $D_1$ layer.

For example, when there are no points positioned between $D_0$ and $D_1$, the PCM code value is zero and the value stored in the modified occupancy map is four. Alternatively, when the all the possible points are filled between D0 and D1, the PCM code value is three and the value in the modified occupancy map is one.

The diagram 610 identifies the most important and least important bits when the PCM code is constructed. The points between near layer 612 and the far layer 614 are described by the PCM code 616. As such the points that are closer to the far layer 614 are more significant than the points that are closer to the near layer 612 in the binary representation of the PCM code 616. In certain embodiments, the PCM code can be generated in the opposite direction. For example, if the PCM code is generated in the opposite direction, the position near the $D_0$ layer (instead as the $D_1$ layer) is most significant in the binary representation of the PCM code.

For example, when a point is present at position $B_{(n-2)}$ a value of one is generated, or when a point is not present a value of zero is generated. Next, when a point is present at position $b_{(n-3)}$ a value of one is generated, or when a point is not present a zero is generated. Next, when a point is present at position $b_1$ a value of one is generated, or when a point is not present a zero is generated. Finally, when a point is present at position $b_0$ a value of one is generated, or when a point is not present a zero is generated. The resulting ones and zeros is the PCM code 616 in binary, similar to the codes in 602 of FIG. 6A. The binary code (of ones and zeros) can be converted into a numerical integer, denoted as the PCM code value, such as in column 604 of FIG. 6A. The PCM code value can then be inputted into Equation (1) which results in the numerical value that is included in the occupancy at the position of the corresponding pixels. Similarly, the PCM code can be solved in Equation (5) by the decoder and when converted back into a binary code, represents the locations of points between $D_0$ and $D_1$, In certain embodiments, when more than two layers are generated by the by the patch generator 514, the intermediate points engine 518 modifies the PCM code 616 to indicate the additional points positioned between the multiple layers. Equation (6) relates the correspondence between the multiple layers. Equation (6) describes the corresponding depths between $D_0$ and $D_{L-1}$, where L is the number of layers and is greater than two.

$$D_0(u,v) \leq D_1(u,v) \leq \ldots \leq D_{L-1}(u,v) \qquad \text{Equation (6)}$$

In certain embodiments, when multiple layers are generated the intermediate points engine 518 derives the PCM code based on $D_0(u,v)$ and $D_1(u,v)$. The intermediate points engine 518 modifies the occupancy map based on the PCM code and the difference between $D_0(u,v)$ and $D_1(u,v)$. The occupied positions between the remaining layers such as between $D_1$ and $D_2$, between $D_2$ and $D_3$, and the like, are included in a PCM points patch. The decoder 550 fills in the positions between D0 and D1 based on the modified occupancy map and fills in the rest of the positions based on the PCM points patch. The PCM points patch can be similar to a missed points patch or an additional points patch.

In certain embodiments, the PCM code is augmented with positions between higher layers such as between $D_1$ and $D_2$ (corresponding to the layer 624 and 626) $D_2$ and between $D_3$ (corresponding to the layer 626 and 628), and the like. FIG. 6C illustrates four layers, such as layer 622, layer 624, layer 626, and layer 628. Similar to FIG. 6B, bits $b_0$, $b_1$, $b_2$, ... $b_{(n-2)}$ denote whether the positions between $D_1$ and $D_2$ are filled. In this example there are no positions between $D_2$ and $D_1$. Bits $b_{(n-1)}$ and $b_n$ specify whether the positions between D3 and D2 are occupied. The PCM code is then formed from the most significant bit to the least significant bit such as: $b_n$, $b_{(n-1)}$, $b_0$, $b_{(n-2)}$, ... $b_1$, $b_0$. The encoder 510 ensures that the augmented bits do not cause an overflow in the occupancy map values. For example, at position $B_n$ when a point is present a 1 is generated, or when a point is not present a zero is generated. Next, at position $b_{(n-1)}$ when a point is present a 1 is generated, or when a point is not present a zero is generated. The process continues for all of the points. Once the points are generated the resulting binary code (of ones and zeros) is converted into a numerical integer, denoted as the PCM code value, such as in column 604 of FIG. 6A.

Figure 7:
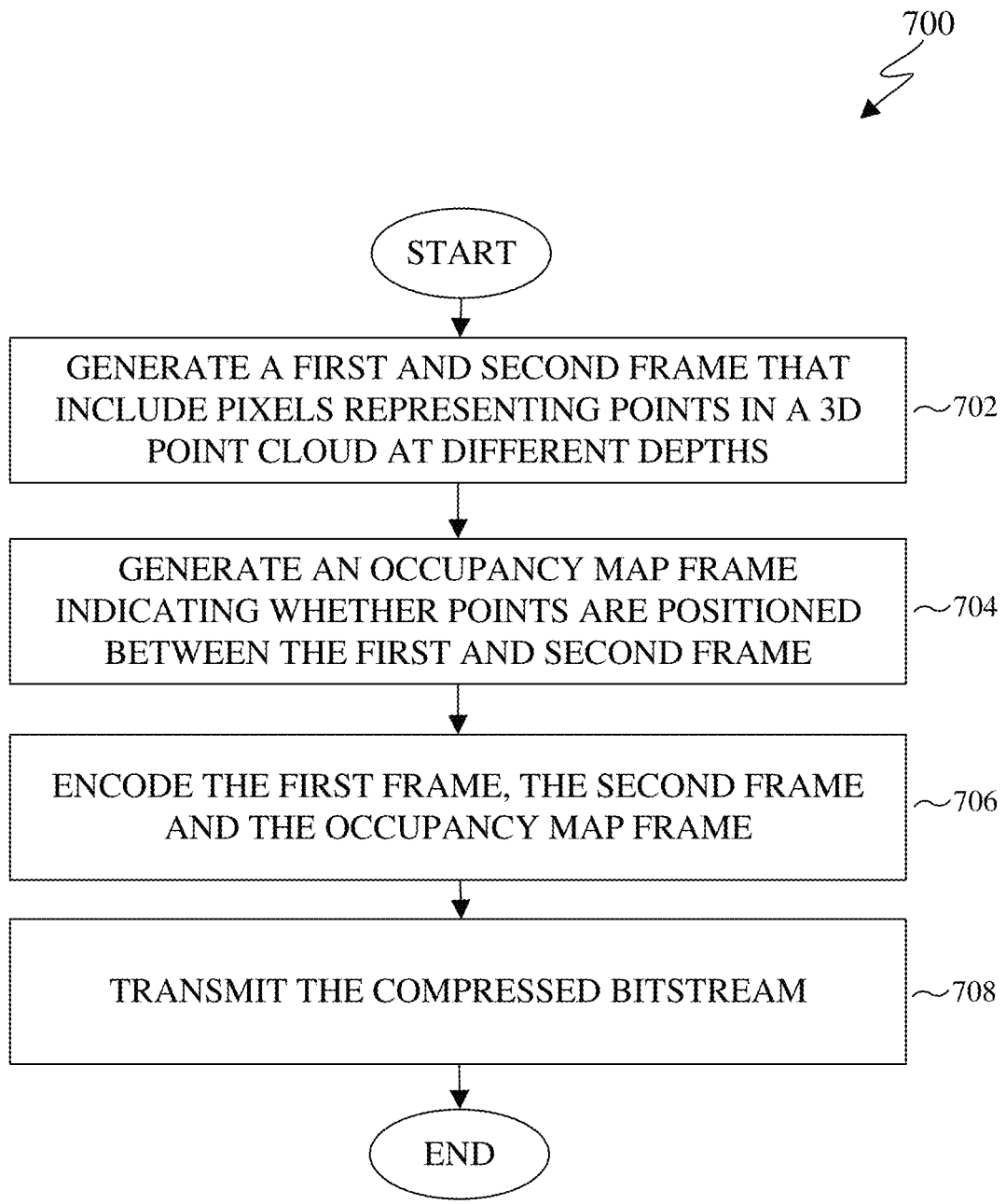
FIG. 7 illustrates example method for encoding a point cloud in accordance with an embodiment of this disclosure.

FIG. 7 illustrate example method 700 for encoding a point cloud in accordance with an embodiment of this disclosure The method 700 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 700 is described as being performed by the encoder 510 of FIGS. 5A and 5B.

In step 702, the encoder 510 generates for a 3D point cloud a first frame and a second frame. The first frame and the second frame include pixels that represent points in the 3D point cloud at different depths. The frames can represent an of the 3D point cloud, such as geometry or a texture. In certain embodiments, the first frame and the second frame represent points of the point cloud at different layers, such as a near layer and a far layer. When the first frame and the second frame represent points of the point cloud at different layers, the first frame and second frame are separated by a surface thickness. The encoder 510 sets the maximum surface thickness. The maximum surface thickness is the maximum distance between a first layer and the second layer.

To generate the first frame and the second frame, the encoder stores a first pixel at a first location in the first frame where the first pixel represents a first point of the 3D point cloud. When a second point of the 3D point cloud is positioned within a distance from the first point, the encoder 510 stores the second pixel in a second frame, at the same location as the first pixel is in the first frame.

In step 704, the encoder 510 generates an occupancy map. The occupancy map indicates whether the pixels within one of the frames are valid or invalid. In certain embodiments, the occupancy map indicates that a pixel in both the first frame and the second frame at a particular coordinate position (in the first frame, the second frame and the occupancy map frame) is valid. That is pixel at a particular (u,v) coordinate in the occupancy map frame indicates whether a pixel at the same (u,v) coordinate in both the first frame and the second frame is valid or invalid. A valid pixel corresponds to the points of the 3D point cloud. The occupancy map also indicates whether points of the 3D point cloud are positioned between the first frame and the second frame at a given position.

To generate the occupancy map, the encoder 510 identifies whether any points of the 3D point cloud are positioned between the points represented at a location in the first frame and the second frame was missed during the projection.

When at least one point of the 3D point cloud is positioned between the points represented at a location in the first frame and the second frame, the encoder 510 generates a value indicating the position and the quantity of the points. Similarly, if no points of the 3D point cloud are positioned between the points represented at a location in the first frame and the second frame, the encoder 510 still generates a value indicating that no points are positioned between the points represented at a location in the first frame and the second frame. The value corresponds to the PCM code. The encoder 510 stores the result of Equation (1) as pixel at the location in the occupancy map that corresponds to the location of the points represented in the first and second frames.

In certain embodiments, the encoder 510 determines whether the difference between a pixel on the first frame at a particular (u,v) coordinate and a pixel on the second frame at the same (u,v) coordinate is greater than one. When the difference is great than one, the encoder 510 generates the PCM code to represent the quantity and position of points. To generate the PCM code, the encoder 510 determines the distance between the point represented at a location in the first frame and a point represented at a location in the second frame. It is noted that the length of the PCM code is based on the distance between a point represented at a location in the first frame and a point represented at a location in the second frame.

When at least one space is positioned between the point represented in the first frame and the point represented in the second frame, the encoder assigns a string of zeros or ones based on the presence of a point between the two points. For example, when a space is empty the encoder 510 assigns a zero and when the space includes a point, the encoder assigns a one. The string of ones and zeros can represent a binary code which is converted to a numerical integer. The binary code can represent the number and position of points between the point represented at a location in the first frame and a point represented at a location in the second frame. The encoder 510 then combines the derived distance and the numerical value representing the binary code using Equation (1) to generate a value that is stored at a pixel location in the occupancy map. The value in the occupancy map is positioned at a location that corresponds to the point represented at a location in the first frame and the point represented at a location in the second frame. In certain embodiments, the value is inversely related to the number of points between the point represented at a location in the first frame and the point represented at a location in the second frame. For example, the more points that are present between the point represented at a location in the first frame and the point represented at a location in the second frame, the smaller the numerical value that is stored in the occupancy map.

The occupancy map at a pixel location is modified when the pixel location does not correspond to an invalid point. The occupancy map at a pixel location is also not modified when the pixel corresponds to a valid point in one of the frames and the $D_1-D_0$ at the location is less than or equal to one. For example, if at position (u,v) the $D_1$ corresponds to a depth 10 and $D_0$ corresponds to a depth 14, the resulting value would be less than zero, indicating that the far layer $D_1$ is actually not further than the near layer $D_0$. The occupancy map at a pixel location is modified when the pixel corresponds to a valid point and the $D_1-D_0$ at the location is greater than one. For each position between $D_0$ and $D_1$, starting with the most important bit, the encoder 510 assigns a one when a point is present or a zero when the space does not have a point.

In certain embodiments, during lossless coding, the occupancy precision is set to one. When the occupancy precision is set to one, the first frame, the second frame, and the third frame are the same size.

In step 706, the encoder 510 encodes the first frame the second frame and the occupancy map frame. After the frames representing geometry, the frames representing texture, and the frames representing the occupancy map are encoded, the encoder 510 can multiplex the frames into a bitstream. In step 708, the encoder 510 transmits the compressed bitstream. The compressed bitstream can be ultimately transmitted to a decoder, such as the decoder 550.

Although FIG. 7 illustrates one example of a method 700 for point cloud encoding, various changes may be made to FIG. 7. For example, while shown as a series of steps, various steps in FIG. 7 could overlap, occur in parallel, or occur any number of times.

Figure 8:
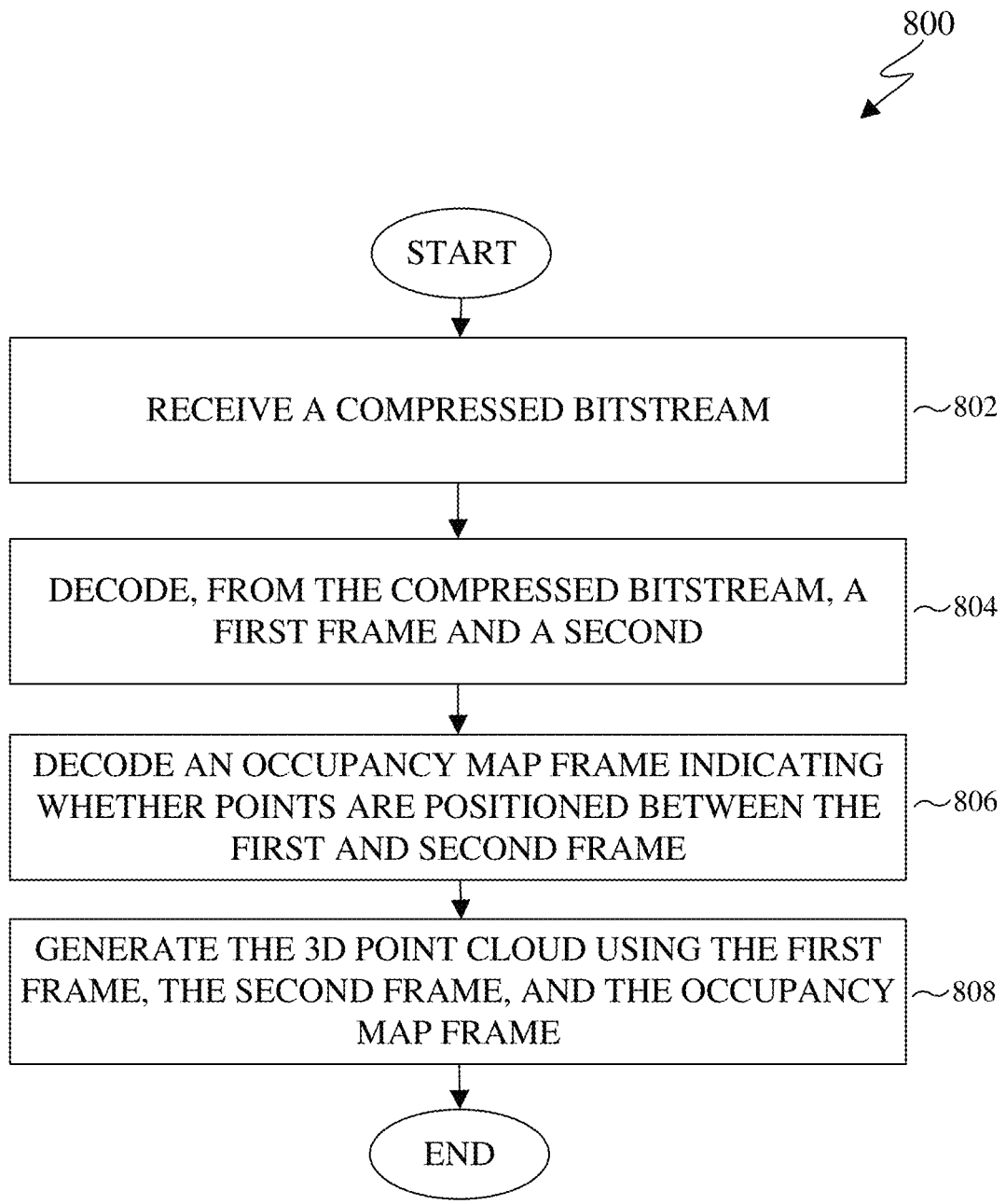
FIG. 8 illustrates example method for decoding a point cloud in accordance with an embodiment of this disclosure.

FIG. 8 illustrate example method 800 for decoding a point cloud in accordance with an embodiment of this disclosure The method 800 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 800 is described as being performed by the decoder 550 of FIGS. 5A and 5C.

The method 800 begins with the decoder, such as decoder 550, receiving a compressed bitstream (step 802). The received bitstream can include an encoded point cloud that was mapped onto multiple 2D frames, compressed, and then transmitted and ultimately received by the decoder 550.

In step 804, the decoder 550 decodes the bitstream into a first frame, a second frame that represent a 3D point cloud. The first frame and the second frame can include pixels representing points of a 3D point cloud at different depths.

In step 806, the decoder 550 decodes an occupancy map from the bitstream. The occupancy map indicates pixels within a geometry frame, or a texture frame that correspond to the points of the 3D point cloud. For example, the occupancy map can indicate whether a pixel within the geometry frame is a valid pixel such that it corresponds to a valid point of the 3D point cloud or an invalid pixel such that the information stored for that pixel does not correspond to the 3D point cloud. For example, a pixel in the occupancy map corresponds to the same coordinate as a pixel in both the first frame and the second frame. Additionally, the occupancy map indicates whether points of the 3D point cloud are positioned between a point represented in the first frame and a point represented in the second frame.

When the value in the occupancy map indicates a valid pixel in the first frame and the second frame, the decoder 550 determine whether a difference between a first pixel in the first frame and a second pixel in the second frame is greater than one. It is noted that the first pixel in the first frame and a second pixel in the second frame are at the same (u,v) coordinate in both frames. When the difference is greater than one, the decoder 550 determines whether the value indicates whether any points of the 3D point cloud are positioned between the first point and a second point, the second point represented by the second pixel. The value can indicate that no points are positioned between the first point (represented by the first pixel) and the second point (represented by the second pixel). The value can also indicate that at least one point of the 3D point cloud is positioned between the first point (represented by the first pixel) and the second point (represented by the second pixel). When the value indicates that at least one point of the 3D point cloud is positioned between the first point and the second point, the value identifies the number of points as well as the position of the points that are positioned between the first point and the second point.

For example, a zero value at a position of the occupancy map indicates that the pixel in the first frame at the same position does not represent a point of the point cloud. A non-zero value at a position of the occupancy map indicates that the pixel in the first frame at the same position indicates that the pixel in the first frame represents a point of the point cloud. When the non-zero value is modified based on the distance between the near layer and the far layer, the number of points and the location of the points can be identified when a binary code is used to represent the modified value. For example, starting at the most significant bit, a zero indicates that the position does not include a point while a one indicates that a point is present in the position. As such, the length of the binary code is dependent on the distance between the first point and the second point.

In certain embodiments, the decoder 550 identifies an occupancy precision of a predetermined value. For example, the predetermined value is one. Based on the predetermined value, the decoder 550 determines that the first frame, the second frame, and the occupancy map frame are the same size.

In step 808, the decoder 550 generates the 3D point cloud. For example, the decoder generates the 3D point cloud based on the first frame and the second frame. Thereafter, the decoder adds in extra points based on whether the occupancy map indicates that points are positioned between points represented in the first frame and the second frame.

Although FIG. 8 illustrates one example of a method 800 for point cloud decoding, various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
   a communication interface configured to receive a compressed bitstream; and
   a processor operably coupled to the communication interface, the processor configured to:
      decode, from the compressed bitstream, a first frame and a second frame that include pixels representing points of a 3D point cloud at different depths;
      decode, from the compressed bitstream, an occupancy map frame indicating whether the pixels included in the first frame and the second frame at that position in the occupancy map frame are valid pixels and whether points of the 3D point cloud are positioned between the first frame and the second frame at that position in the occupancy map frame; and
      generate the 3D point cloud using the first frame, the second frame, and the occupancy map frame.

2. The decoding device of claim 1, wherein:
   the first frame, the second frame, and the occupancy map frame are a first size;
   a pixel at a location in the occupancy map frame indicates whether a pixel at the same location in the first frame is valid; and
   to indicate that points of the 3D point cloud are positioned between the first frame and the second frame, the processor is configured to identify whether depth values between the first frame and the second frame are occupied at the location of the pixel in the first frame.

3. The decoding device of claim 1, wherein a depth value of a pixel included in the second frame is between a corresponding depth value of a pixel included in the first frame and a maximum surface thickness.

4. The decoding device of claim 1, wherein the processor is configured to:
   identify a value at a first coordinate position on the occupancy map frame, and a first pixel at a second coordinate position on the first frame, wherein the first coordinate position and the second coordinate position are the same;
   determine, based on the value, whether the first pixel is valid or invalid, wherein the first pixel represents a first point of the 3D point cloud when the first pixel is valid;
   when the value is valid, determine whether a difference between the first pixel in the first frame, at the second coordinate position, and a second pixel in the second frame, at a third coordinate position, is greater than one, wherein the second coordinate position and the third coordinate position are the same;
   when the difference is greater one, determine whether the value indicates whether any points of the 3D point cloud are positioned between the first point and a second point, the second point represented by the second pixel;
   when the value indicates that no points of the 3D point cloud are positioned between the first point and the second point, determine that that no points of the 3D point cloud are positioned between the first point and the second point; and
   when the value indicates that at least one point of the 3D point cloud is positioned between the first point and the second point, identify, based on the value, a quantity of points of the at least one point and corresponding positions of the at least one point positioned between the first point and the second point.

5. The decoding device of claim 4, wherein the processor is further configured to:
- derive a distance between the first pixel and the second pixel; and
- identify a numerical integer based on the value and the distance between the first pixel and the second pixel,
- wherein the numerical integer when expressed as a binary code represents the quantity of points that are positioned between the first point and the second point and the corresponding positions of the at least one point between the first point and the second point.

6. The decoding device of claim 5, wherein a length of the binary code is based on the distance between the first point and the second point.

7. The decoding device of claim 5, wherein the value is inversely proportional to the quantity of points that are positioned between the first point and the second point.

8. An encoding device for point cloud encoding, the encoding device comprising:
- a processor configured to:
  - generate, for a three-dimensional (3D) point cloud, a first frame and a second frame that include pixels representing points in the 3D point cloud at different depths;
  - generate an occupancy map frame indicating whether the pixels included in the first frame and the second frame at that position in the occupancy map frame are valid pixels and whether points of the 3D point cloud are positioned between the first frame and the second frame at that position in the occupancy map frame; and
  - encode the first frame, the second frame and the occupancy map frame to generate a compressed bitstream; and
- a communication interface operably coupled to the processor, the communication interface configured to transmit the compressed bitstream.

9. The encoding device of claim 8, wherein:
- the first frame, the second frame, and the occupancy map frame are a first size; and
- a pixel at a location in the occupancy map frame indicates whether a pixel at the same location in the first frame is valid.

10. The encoding device of claim 8, wherein:
- the processor is further configured to identify a maximum surface thickness representing a maximum distance between the first frame and the second frame, and
- a depth value of a pixel included in the second frame is between a corresponding depth value of a pixel included in the first frame and the maximum surface thickness.

11. The encoding device of claim 8, wherein:
- to generate the first frame and the second frame, the processor is further configured to:
  - store a first pixel representing a first point of the 3D point cloud to a first location in the first frame, and
  - when a second point of the 3D point cloud is positioned within a distance from the first point, store a second pixel representing the second point of the 3D point cloud to the first location in the second frame;
- to generate the occupancy map frame, the processor is further configured to:
  - determine whether a difference between the first pixel in the first frame, and the second pixel in the second frame, is greater than one;
  - when the difference is greater one, identify whether any points of the 3D point cloud are positioned between the first point and the second point;
  - when no points of the 3D point cloud are positioned between the first point and the second point, generate a first value indicating no points are positioned between the first point and the second point;
  - when at least one point of the 3D point cloud is positioned between the first point and the second point, generate a second value indicating a position and a quantity of points, of the at least one point, that are positioned between the first point and the second point, and
  - store the first value or the second value in the first location of the occupancy map frame; and
- the first location on the first frame, the first location on the second frame, and the first location of the occupancy map frame, correspond to the same coordinate positions.

12. The encoding device of claim 11, wherein:
- the second value and indicates that the at least one point is positioned between the first point and the second point, and
- when the first point is adjacent to the second point, the processor is further configured to store a third value in the first location of the occupancy map frame.

13. The encoding device of claim 11, wherein to generate the first value and the second value, the processor is further configured to:
- derive the distance between the first pixel and the second pixel;
- identify a numerical integer that when expressed as a binary code represents the quantity of points that are positioned between the first point and the second point and the position of the at least one point between the first point and the second point; and
- combine the distance and the numerical integer to generate the first value and the second value.

14. The encoding device of claim 13, wherein a length of the binary code is based on the distance between the first point and the second point.

15. The encoding device of claim 13, wherein the first value and the second value is inversely proportional to the quantity of points that are positioned between the first point and the second point.

16. A method for point cloud decoding comprising:
- receiving a compressed bitstream;
- decoding, from the compressed bitstream, a first frame and a second frame that include pixels representing points of a 3D point cloud at different depths;
- decoding, from the compressed bitstream, an occupancy map frame indicating whether the pixels included in the first frame and the second frame at that position in the occupancy map frame are valid pixels and whether points of the 3D point cloud are positioned between the first frame and the second frame at that position in the occupancy map frame; and
- generating the 3D point cloud using the first frame, the second frame, and the occupancy map frame.

17. The method of claim 16, further comprising:
- identifying a value at a first coordinate position on the occupancy map frame, and a first pixel at a second coordinate position on the first frame, wherein the first coordinate position and the second coordinate position are the same;

determining, based on the value, whether the first pixel is valid or invalid, wherein the first pixel represents a first point of the 3D point cloud when the first pixel is valid;

when the value is valid, determine whether a difference between the first pixel in the first frame, at the second coordinate position, and a second pixel in the second frame, at a third coordinate position, is greater than one, wherein the second coordinate position and the third coordinate position are the same;

when the difference is greater than one, determining whether the value indicates whether any points of the 3D point cloud are positioned between the first point and a second point, the second point represented by the second pixel;

when the value indicates that no points of the 3D point cloud are positioned between the first point and the second point, determine that that no points of the 3D point cloud are positioned between the first point and the second point; and when the value indicates that at least one point of the 3D point cloud is positioned between the first point and the second point, identifying, based on the value, a quantity of points of the at least one point and corresponding positions of the at least one point positioned between the first point and the second point.

18. The method of claim 17, further comprising:
deriving a distance between the first pixel and the second pixel; and
identifying a numerical integer based on the value and the distance between the first pixel and the second pixel,
wherein the numerical integer when expressed as a binary code represents the quantity of points that are positioned between the first point and the second point and the corresponding positions of the at least one point between the first point and the second point.

19. The method of claim 18, wherein a length of the binary code is based on the distance between the first point and the second point.

20. The method of claim 18, wherein the value is inversely proportional to the quantity of points that are positioned between the first point and the second point.

* * * * *